(12) United States Patent
King et al.

(10) Patent No.: US 6,721,288 B1
(45) Date of Patent: Apr. 13, 2004

(54) WIRELESS MOBILE DEVICES HAVING IMPROVED OPERATION DURING NETWORK UNAVAILABILITY

(75) Inventors: Peter F. King, Half Moon Bay, CA (US); Bruce K. Martin, Jr., Palo Alto, CA (US); Stephen S. Boyle, Fremont, CA (US); Bruce V. Schwartz, San Mateo, CA (US); Lawrence Stein, San Jose, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/170,879

(22) Filed: Oct. 13, 1998

Related U.S. Application Data

(60) Provisional application No. 60/100,663, filed on Sep. 16, 1998.

(51) Int. Cl.[7] .............................................. G06F 16/153
(52) U.S. Cl. ........................ 370/310; 370/328; 709/203
(58) Field of Search ................................. 370/392, 471, 370/328, 310; 455/466; 709/203

(56) References Cited

U.S. PATENT DOCUMENTS

| | | | |
|---|---|---|---|
| 5,438,611 A | | 8/1995 | Campana, Jr. et al. |
| 5,461,667 A | | 10/1995 | Remillard |
| 5,487,100 A | | 1/1996 | Kane |
| 5,579,472 A | | 11/1996 | Keyworth, II et al. |
| 5,790,800 A | * | 8/1998 | Gauvin et al. ......... 395/200.57 |
| 5,809,415 A | | 9/1998 | Rossmann |
| 5,822,692 A | | 10/1998 | Krishan et al. |
| 5,850,517 A | * | 12/1998 | Verkler et al. ......... 395/200.92 |
| 5,903,652 A | | 5/1999 | Mital |
| 5,933,478 A | | 8/1999 | Ozaki et al. |
| 5,987,609 A | | 11/1999 | Hasebe |
| 6,006,087 A | | 12/1999 | Amin |
| 6,014,559 A | | 1/2000 | Amin |
| 6,052,735 A | | 4/2000 | Ulrich et al. |
| 6,055,426 A | | 4/2000 | Beasley |

(List continued on next page.)

FOREIGN PATENT DOCUMENTS

| | | |
|---|---|---|
| EP | 0 845 894 A2 | 6/1998 |
| EP | 0 924 921 A1 | 6/1999 |
| GB | 0994608 A2 | 4/2000 |
| WO | WO98/10580 | 3/1998 |

OTHER PUBLICATIONS

Lambert, "PCMAIL: A Distributed Mail System for Personal Computers," RFC 1056, Jun. 1988.

(List continued on next page.)

*Primary Examiner*—Kenneth Vanderpuye
(74) *Attorney, Agent, or Firm*—Beyer Weaver & Thomas, LLP

(57) ABSTRACT

Improved techniques for reducing delays faced by users of mobile devices due to unavailability of wireless networks are disclosed. The techniques facilitate the reduction of delays faced by users of mobile devices during unavailability of wireless networks. A first technique allows mobile devices to communicate with remote servers using asynchronous communications, namely asynchronous requests. Such asynchronous communications allow the processing at a mobile device to continue while the asynchronous request is processed in the background. A second technique pertains to the use of content channels with mobile devices. The content channels are stored and retained in cache memory so that their resources are guaranteed to be locally available, regardless of availability of wireless networks. A third technique pertains to improved list processing within mobile devices such that lists can be manipulated without server interaction. These various techniques can be used separately or in combination.

28 Claims, 19 Drawing Sheets

U.S. PATENT DOCUMENTS

| | | | |
|---|---|---|---|
| 6,065,120 | A | 5/2000 | Laursen et al. |
| 6,094,681 | A | 7/2000 | Shaffer et al. |
| 6,101,244 | A | 8/2000 | Okada |
| 6,108,688 | A | 8/2000 | Nielsen |
| 6,119,167 | A | 9/2000 | Boyle et al. |
| 6,181,736 | B1 | 1/2001 | McLaughlin et al. |
| 6,185,208 | B1 * | 2/2001 | Liao ............................ 370/392 |
| 6,289,212 | B1 | 9/2001 | Stein et al. |
| 6,314,108 | B1 | 11/2001 | Ramasubramani et al. |
| 6,317,831 | B1 * | 11/2001 | King ........................... 713/171 |
| 6,424,841 | B1 * | 7/2002 | Gustafsson .................. 455/466 |

OTHER PUBLICATIONS

Kaashoek et al., "Dynamic Documents: Mobile Wireless Access to the WWW," Proceedings of Workshop on Mobile Computing Systems and Applications, IEEE Computer Society Press, Dec. 1994, pp. 179–184.

Hild, "Mobilizing Applications," IEEE Personal Communications, vol. 4, No. 5, Oct. 1997, pp. 26–34.

HDML 2.0 Language Reference, Version 2.0, Unwired Planet, Inc. Software Developer Kit, Jul. 1997.

"HDTP Draft Specification", Version 1.1, Unwired Planet, Inc. 1997.

"Wireless Application Protocol Wireless Session Protocol Specification" (WAP WSP), Version 30, Apr. 1998.

"Wireless Application Protocol Wireless Markup Language Specification" (WAP WML), Version 30, Apr. 1998.

Document Object Model (DOM), W3C Specification, Jul. 20, 1998 http://www.w3.org/TR/1998/WD–DOM–19980720/.

Chang et al., "Web Browsing in a Wireless Environment: Disconnected and Asynchronous Operation in ARTour Web Express," MOBICOM 97, Budapest Hungary, 1997.

Liljeberg et al., "Ehanced Services for World–Wide Web in Mobile WAN Environment," University of Helsinke, Department of Computer Science, Report C, No. C–1996–28, Apr. 1996.

Schilit et al., "TeleWeb: Loosely connected access to the World Wide Web," Computer Networks and ISDN Systems, vol. 28, pp. 1431–1444, 1996.

Alanko et al., "Mowgli: Improvements for Internet Applications Using Slow Wireless Links," University of Helsinke, Department of Computer Science, PIMPC '97, pp. 1038–1042, 1997.

* cited by examiner

WIRELESS MOBILE DEVICES HAVING IMPROVED OPERATION DURING NETWORK UNAVAILABILITY

CROSS-REFERENCE TO RELATED APPLICATIONS

This application claims the benefit of U.S. Provisional Application No. 60/100,663, filed Sep. 16, 1998, and entitled "WIRELESS MOBILE DEVICES HAVING IMPROVED OPERATION DURING NETWORK UNAVAILABILITY", the content of which is hereby incorporated by reference. This application is particularly related to U.S. application Ser. No. 09/172,105, now U.S. Pat. No. 6,289,212, filed concurrently herewith, and entitled "METHOD AND APPARATUS FOR PROVIDING ELECTRONIC MAIL SERVICES DURING NETWORK UNAVAILABILITY", the content of which is hereby incorporated by reference. This application is also related to (i) U.S. application Ser. No. 08/977,572, now U.S. Pat. No. 6,119,167, filed Jul. 11, 1997, and entitled "PUSHING AND PULLING DATA IN NETWORKS", and (ii) U.S. application Ser. No. 09/070,668, now U.S. Pat. No. 6,314,108, filed Apr. 30, 1998, and entitled "METHOD AND APPARATUS FOR PROVIDING NETWORK ACCESS OVER DIFFERENT WIRELESS NETWORKS", the contents of which are hereby incorporated by reference.

BACKGROUND OF THE INVENTION

1. Field of the Invention

The present invention relates to wireless networks, and more particularly, to operation of wireless mobile devices during unavailability of wireless networks.

2. Description of the Related Art

Wireless networks are often used to transmit messages from one location in a network to a destination location in the network. These messages contain data to be supplied to the destination location. More specifically, the messages include a header portion and a data portion. The header portion includes an address of the destination location, and the data portion contains data. The destination location is, for example, a mobile device or a server. A mobile device typically interacts with wireless networks to receive various types of notifications or to request and receive data from another network to which the wireless network is connected.

FIG. 1 is a block diagram of a conventional wireless communication system 10. The wireless communication system 10 includes a server 12, a wireless network 14, and mobile devices 16. There are n mobile devices 16-1 through 16-n. The server 12 is typically a computer system that operates to send and receive messages to and from the mobile devices 16. The messages are often blocks of data that are to be transmitted to the mobile device 16. As examples, the data can pertain to various types of notifications, electronic mail, news data, configuration information, data files, library files, program files, etc. The messages can also be requests for information (e.g., certain data) that are transmitted from the mobile devices 16 to the server 12. The server 12 may also connect to other wired or wireless networks to receive messages from or forward messages to other computer systems. As an example, the server 12 can be connected to the Internet. For example, the server 12 can be a proxy server (or link server) coupled to the Internet or a network gateway coupled to a network. The tremendous growth of the Internet in recent years has fueled the need to provide mobile devices such as mobile telephones, personal digital assistants (PDAs) and the like with access to information and services available on the Internet.

The wireless network 14 typically uses radio transmissions to communicate with the mobile devices 16. The wireless network 14 can use a variety of different networks and communication protocols. Examples of wireless networks include Cellular Digital Packet Data (CDPD), Global System for Mobile Communications (GSM), Code Division Multiple Access (CDMA) and Time Division Multiple Access (TDMA) to name a few, and each of these wireless networks has different data transfer characteristics such as latency, bandwidth, protocols and connection methods. As examples, protocols can be Internet Protocol (IP), Short Messaging System (SMS) and Unstructured Supplementary Service Data (USSD), and connection methods can include packet switched or circuit switched.

As an example, a message to be sent by the server 12 to the mobile device 16-2 would contain an address that particularly identifies the mobile device 16-2. The message is then provided by the server 12 to the wireless network 14. For example, one wireless data network is a packet switched network using a Small Message Server Center (SMSC) which has a relatively small packet size (e.g., 140 bytes). The wireless network 14 causes the message to be properly routed to the mobile device 16-2 (i.e., in accordance with the address). The transmission between the wireless network 14 and mobile device 16-2 is wireless. The mobile device 16-2 receives the message that has been transmitted to the wireless network 14. The mobile device 16-2 can then store the message and perform predetermined processing actions such as, for example, notifying a user of the mobile device 16-2 of the reception of the message.

In some wireless networks, the server and the mobile devices can be connected by two or more channels. In one case, the server and mobile devices can be connected over a one-way data channel and a two-way data channel. A representative network (e.g., GSM) having such characteristics can use a Short Message Service Center (SMSC) to provide the one-way data channel and an Interworking Function (IFW) to provide the two-way data channel. In such a network, the one-way data channel is often considered a narrowband channel and the two-way data channel is often considered a wideband channel. As an example, the narrowband channel can transfer data at a rate of about 400 bits per second (bps), while the wideband channel can transfer data at a rate of at least 14400 bps. It is thus not uncommon that a server and a mobile device be connected (or connectable) by both a two-way channel and a one-way channel. Typically, the server and the client will decide to use either or both of the channels depending on the urgency of the data, the cost willing to incur, etc. Use of a two-way channel often causes the mobile device to incur charges (i.e., fees) from a carrier that provides the service to the mobile device. In contrast, use of a one-way, narrowband channel is often available at no cost or at a fixed cost regardless of usage.

One problem with the conventional wireless communication systems is that the operation of mobile devices are very much dependent on availability of their wireless network. In other words, when the wireless network is unavailable, the mobile devices may stop processing user inputs as they wait for a response from a remote server via the wireless network. Unavailability of a wireless network can result from a user of a mobile device exceeding their geographic range of coverage. Unavailability also effectively results from a wireless network having high latencies or a wireless network having sporadic connectivity. Because of the dependency of the operation of mobile devices on the availability of wireless networks, mobile devices often have to wait for resources from a remote server.

Mobile devices are often provided with cache memories that temporarily store previously requested and obtained resources from remote servers. A cache memory is helpful in reducing the dependency of mobile devices on network availability. However, the cache memory is only helpful when the newly requested resource happens to reside in the cache memory. Hence, if the newly requested resource was not previously requested, then the newly requested resource would not be stored in the cache memory. Also, even it the newly requested resource were at one point in time stored in the cache memory, a reclamation or clean-up algorithm could have removed it from the cache memory to provide space for newer requested resources.

Another problem with the conventional wireless communication systems is that the dominating application model has a synchronous nature. The synchronous nature causes the application to wait for responses to requests to remote servers (unless satisfied by the cache memory). The wait times are unacceptably long when the wireless network is unavailable to the mobile devices.

One popular application is a network browser that is used on mobile devices to browse a network such as the Internet. Such as network browser is known as a web browser. The network browser is often requesting resources from remote servers over the wireless network. Hence, network browsers are particularly sensitive to network unavailability (e.g., due to out of coverage, high latencies, or sporadic connectivity). Consequently, it is common for network unavailability to induce significant waits for the users of network browsers on mobile devices.

Thus, there is a need for techniques to reduce delays faced by users of mobile devices due to unavailability of wireless networks.

SUMMARY OF THE INVENTION

Broadly speaking, the invention relates to improved techniques for reducing delays faced by users of mobile devices due to unavailability of wireless networks. The invention has at least three aspects that facilitate the reduction of delays faced by users of mobile devices during unavailability of wireless networks. A first aspect of the invention allows mobile devices to communicate with remote servers using asynchronous communications, namely device to continue while the asynchronous request is processed in the background. A second aspect of the invention pertains to the use of content channels with mobile devices. The content channels are stored and retained in cache memory so that their resources are guaranteed to be locally available, regardless of availability of wireless networks. A third aspect of the invention pertains to improved list processing within mobile devices such that lists can be manipulated without server interaction. These various aspects of the invention can be used separately or in combination.

The invention can be implemented in numerous ways, including as a method, a computer readable medium, an apparatus, and a system. Several embodiments of the invention are discussed below.

As a method for sending a resource request of a mobile device to a remote server through a wireless network, an embodiment of the invention includes the acts of: receiving a resource request, the requested resource being associated with the remote server; determining whether the requested resource is of a synchronous type resource request or of a an asynchronous type resource request; placing the resource request in an outgoing queue and not awaiting a resource reply when the resource request is determined to be an asynchronous type resource request; and when the resource request is determined to be a synchronous type resource request, performing the acts of (i) determining whether the requested resource is present in a local cache memory of the mobile device; (ii) supplying the requested resource from the local cache memory when it is determined that the requested resource is present in the local cache memory; and (iii) sending the resource request to the remote server through the wireless network and awaiting a resource reply when it is determined that the requested resource is not present in the local cache memory.

As a mobile device that connects to a remote server through a network, an embodiment of the invention includes: an application that executes on the mobile device, the application produces outgoing messages that are to be sent to the remote server; an asynchronous message queue that stores outgoing messages from the application that are to be sent from the mobile device to the remote server; and an asynchronous message manager that manages the sending of the outgoing messages from the asynchronous message queue to the remote server through the network.

Optionally, the mobile device can further include a cache memory that stores resources likely to be requested by the application, a channel manager that loads a content channel into the cache memory from the remote server through the wireless network, and a list manager that manages lists provided on the mobile device such that lists can be manipulated without interaction with the remote server through the network.

As a method for storing a content channel from a remote server onto a mobile device through a wireless network, the content channel including resources, an embodiment of the invention includes the acts of: receiving an instruction to load the content channel into a cache memory of the mobile device; determining whether the content channel can fit within a reserved portion of the cache memory of the mobile device; and loading the content channel into the reserved portion of the cache memory from the remote server through the wireless network when the determining determines that the content channel is able to fit within the reserved portion of the cache memory.

As a method for manipulating a list resident on a mobile device used with a wireless communication system, an embodiment of the invention comprising the acts of: displaying a list on a display device of the mobile device, the list being displayed from a descriptive file; receiving, at the mobile device, a list command to modify the displayed list; locating a list object stored within the mobile device, the list object corresponding to the displayed list; modifying the list object in accordance with the list command; obtaining, from the list object, a pointer to the descriptive file; locating a portion of the descriptive file to be modified using at least the pointer; and modifying the located portion of the descriptive file in accordance with the list command.

As a computer readable medium including computer program code for sending a resource request of a mobile device to a remote server through a wireless network, an embodiment of the invention includes: computer program code for receiving a resource request, the requested resource being associated with the remote server; computer program code for determining whether the requested resource is of a synchronous type resource request or of a an asynchronous type resource request; computer program code for placing the resource request in an outgoing queue and not awaiting a resource reply when the resource request is an asynchronous type resource request; and computer program code for sending the resource request to the remote server through the wireless network and awaiting a resource reply when the resource request is a synchronous type resource request.

The advantages of the invention are numerous. Several advantages that embodiments of the invention may include are as follows. One advantage of the invention is that operation of mobile devices is less dependent on network availability. As a result, users of mobile devices experience better responsiveness and less waiting. Another advantage of the invention is that both synchronous and asynchronous messaging are available to mobile devices. Still another advantage of the invention is that a programmer or content author can determine how navigation is performed, namely whether synchronous requests or asynchronous requests are used. Yet another advantage of the invention is that lists can be manipulated on mobile devices without having to support or provide the significant amounts of resources needed to provide scripting. Another advantage of the invention is the ability to obtain and guarantee the presence of certain content channels at mobile devices.

Other aspects and advantages of the invention will become apparent from the following detailed description, taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

In a wireless communication system, a wireless network (wireless carrier network) generally supports connection of a plurality of mobile devices to a wired network. The mobile devices communicate with server machines on the wired network to request and receive various resources. The wired network can be of different types. One type of wired network is the Internet. The invention pertains to the facilitating of operation of mobile devices when the wireless network is unavailable such that the mobile devices are unable to communicate with the server machines on the wired network.

The invention relates to improved techniques for reducing delays faced by users of mobile devices due to unavailability of wireless networks. The invention has at least three aspects that facilitate the reduction of delays faced by users of mobile devices during unavailability of wireless networks. A first aspect of the invention allows mobile devices to communicate with remote servers using asynchronous communications, namely asynchronous requests. Such asynchronous communications allow the processing at a mobile device to continue while the asynchronous request is processed in the background: A second aspect of the invention pertains to the use of content channels with mobile devices. The content channels are stored and retained in cache memory so that their resources are guaranteed to be locally available, regardless of availability of wireless networks. A third aspect of the invention pertains to improved list processing within mobile devices such that lists can be manipulated without server interaction. These various aspects of the invention can be used separately or in combination. When these aspect are used in combination, applications can be created that smoothly operate regardless of periodic unavailability of the network.

Embodiments of the invention are discussed below with reference to FIGS. 1B–11. However, those skilled in the art will readily appreciate that the detailed description given herein with respect to these figures is for explanatory purposes as the invention extends beyond these limited embodiments.

Figure 1A:
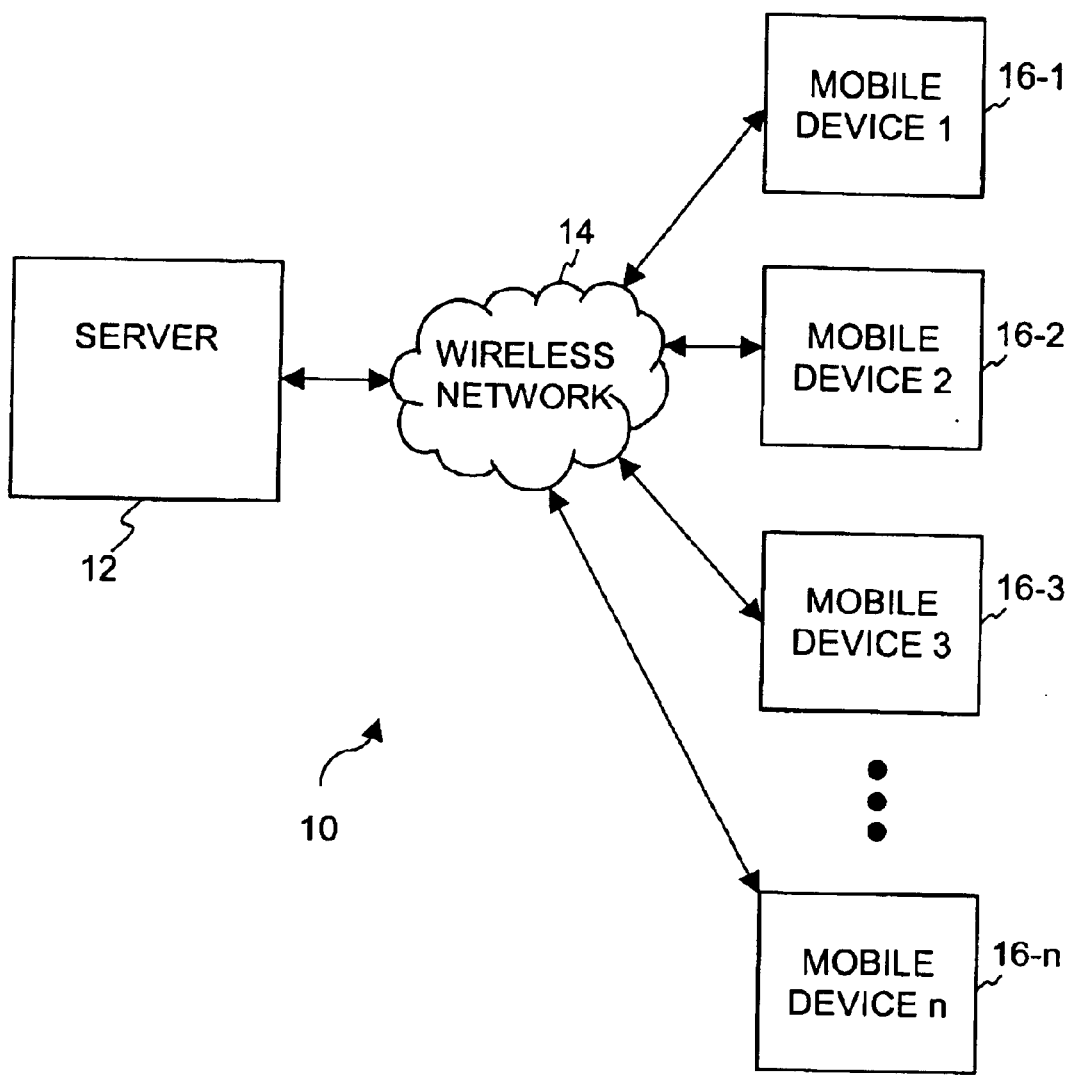
FIG. 1A is a block diagram of a conventional wireless communication network.
Figure 1B:
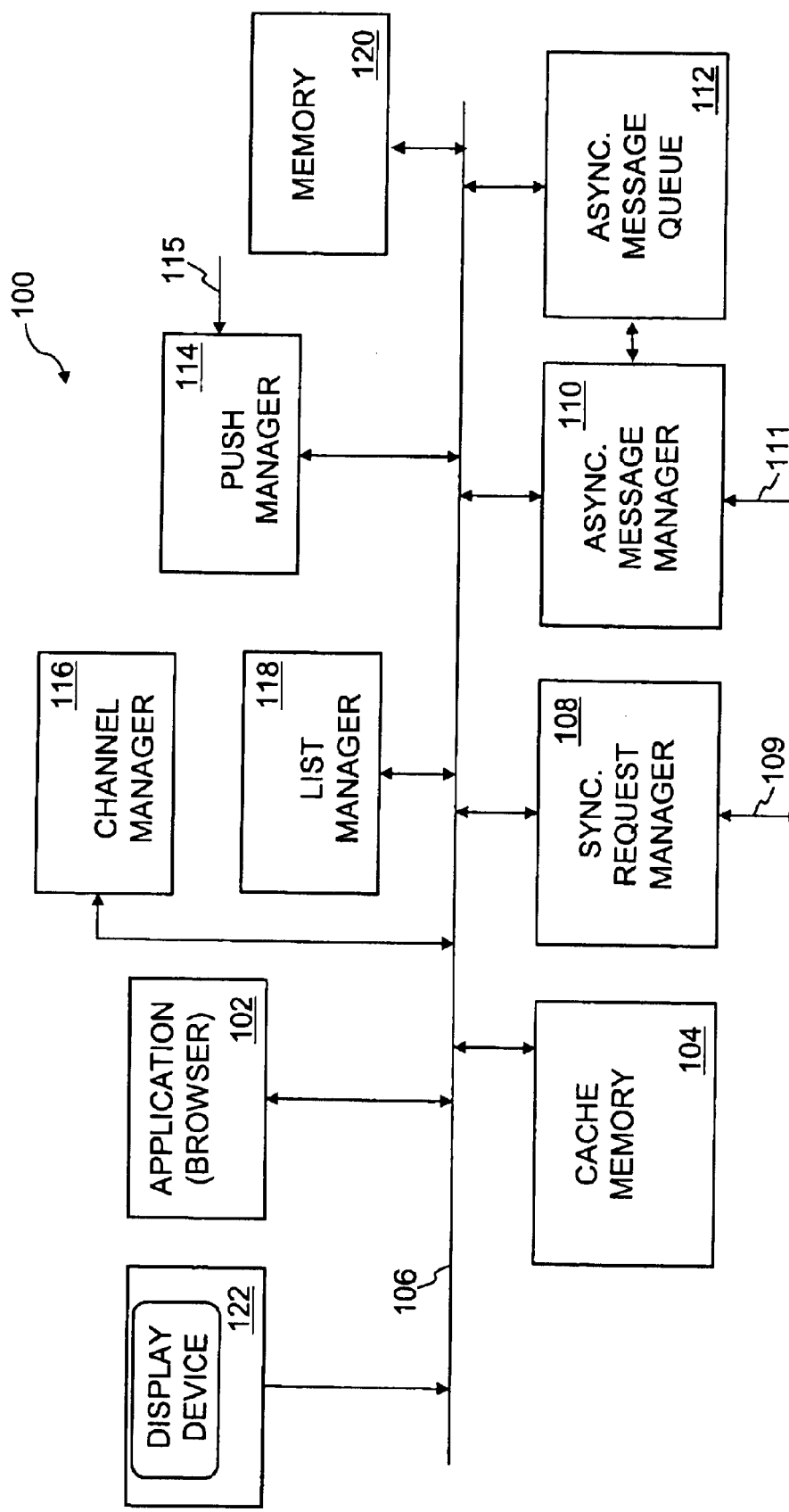
FIG. 1B is a block diagram of a mobile device according to an embodiment of the invention.

FIG. 1B is a block diagram of a mobile device 100 according to an embodiment of the invention. The mobile device 100 is particularly suited for wireless communications through a wireless network where connectivity is sporadic or high-latency conditions are present.

The mobile device 100 includes an application 102 that couples to a cache memory 104 through an interface 106. The application 102 is, for example, a network browser (web browser) application that allows a user of the mobile device 100 to request and receive resources provided on a remote network (e.g., Internet) that the mobile device 100 is able to communicate with. The cache memory 104 stores resources that have been previously requested and received by the mobile device 100. Additionally, as will be discussed below, the cache memory 104 is also used to store various channels and lists that are used to improve performance of the mobile device 100.

The mobile device 100 also includes a synchronous request manager 108 and an asynchronous message manager 110. The synchronous request manager 108 manages the synchronous sending and receiving of messages with respect to the remote network a wireless communication link 109. The operation of the synchronous request manager 108 is described in greater detail below with respect with to FIG. 2B. The asynchronous message manager 110 manages the asynchronous sending of messages with respect to the network via a wireless communication link 111. The asynchronous message manager 110 is provided so that the mobile device 100 can communicate with the remote network in an asynchronous manner. The ability of the mobile device 100 to communicate in an asynchronous manner is particularly useful in cases where the wireless network has high-latency conditions or suffers from sporadic connectivity. The operation of the asynchronous message manager 110 is further discussed below with respect to FIG. 3.

The asynchronous message manager 110 connects to an asynchronous message queue 112 that stores messages that are to be sent to the remote network via the asynchronous message manager 110 and the wireless communication link 111. In general, the messages awaiting transmission to the remote network remain in the asynchronous message queue 112 until the asynchronous message manager 110 determines that the wireless network is available, and then proceeds to service the particular messages stored in the asynchronous message queue 112 such that they are sent to the remote network through the wireless communication link 111 of the wireless network when the wireless network is available.

The push manager 114 receives pushed messages (e.g., resources) from the remote network over a wireless communication link 115. These pushed messages that are received by the push manager 114 over the wireless communication link 115 are either in response to requests that have been asynchronously sent by the mobile device 100 or provided ("pushed") by a remote server to the mobile device 100 connects via the wireless network.

The mobile device 100 also includes a channel manager 116 and a list manager 118. The channel manager 116 operates to load certain content channels into the cache memory 104 of the mobile device 100. The content channels are loaded into the cache memory 104 by the channel manager 116 so that the performance of the mobile device 100 is improved with respect to the particular content associated with the content channels loaded in the cache memory 104. In particular, should a user of the mobile device 100 request (via the application 102) a resource associated with a content channel stored in the cache memory 104, then the requested resource can be rapidly supplied to application 102 via the cache memory 104. Otherwise, when a requested resource is not found in the cache memory 104, the availability of the requested resource at the mobile device is relatively slow because the request must be sent to either the synchronous request manager 108 or the asynchronous message manager 110 to obtain the resource from a remote server located on the remote network.

The list manager 118 operates to store one or more lists in a memory 120 (e.g., random-access memory). In one embodiment, the list manager 120 stores the one or more lists in a persistent memory (such as a persistent portion of the cache memory 104). The lists that are stored in the memory 120 are used to enable the list manager 118 to manipulate various lists that are used by user interfaces associated with the application 102. The user interfaces operate to display the various lists on a display 122. Such lists are thus able to be modified locally within the mobile device 100 without the need for availability of the wireless network. The memory 120 can also store resources from the remote network that are used to configure or operate the mobile device 100.

Although not shown in FIG. 1, often a mobile device communicates with the remote network through a proxy server. Namely, the mobile device connects to the proxy server through the wireless network and the proxy server in turn connects to the remote network.

The first aspect of the invention is to provide a mobile device that provides asynchronous communications to a server machine of a wired network. Conventionally, mobile devices (namely, applications executing thereon) have largely requested resources from a remote server through a two-way synchronous channel from the mobile device to the wireless network. The problem with use of a synchronous channel is that the mobile device is inactive while it awaits the response from the remote server. In cases where the wireless network is unavailable (e.g., out-of-range or suffering from high latencies), the mobile device is forced to waits for inordinate periods of time. According to the first aspect of the invention, the mobile devices can use asynchronous communications with the remote server when either the request need not be sent immediately or the response from the remote server is not needed immediately. The network unavailability is temporary such as due to high latencies or sporadic connectivity. With asynchronous communications, an application on the mobile device does not await the sending of the request or the receiving of the response from the remote server.

The first aspect of the invention is described in greater detail below with respect to FIGS. 2A–4. According to the first aspect of the invention, a mobile device provides asynchronous communications (alone or in combination with synchronous communications) to a server machine of a wired network. With asynchronous communications, the mobile device does not await the sending of the request or receiving of the response from the remote server.

Figure 2A:
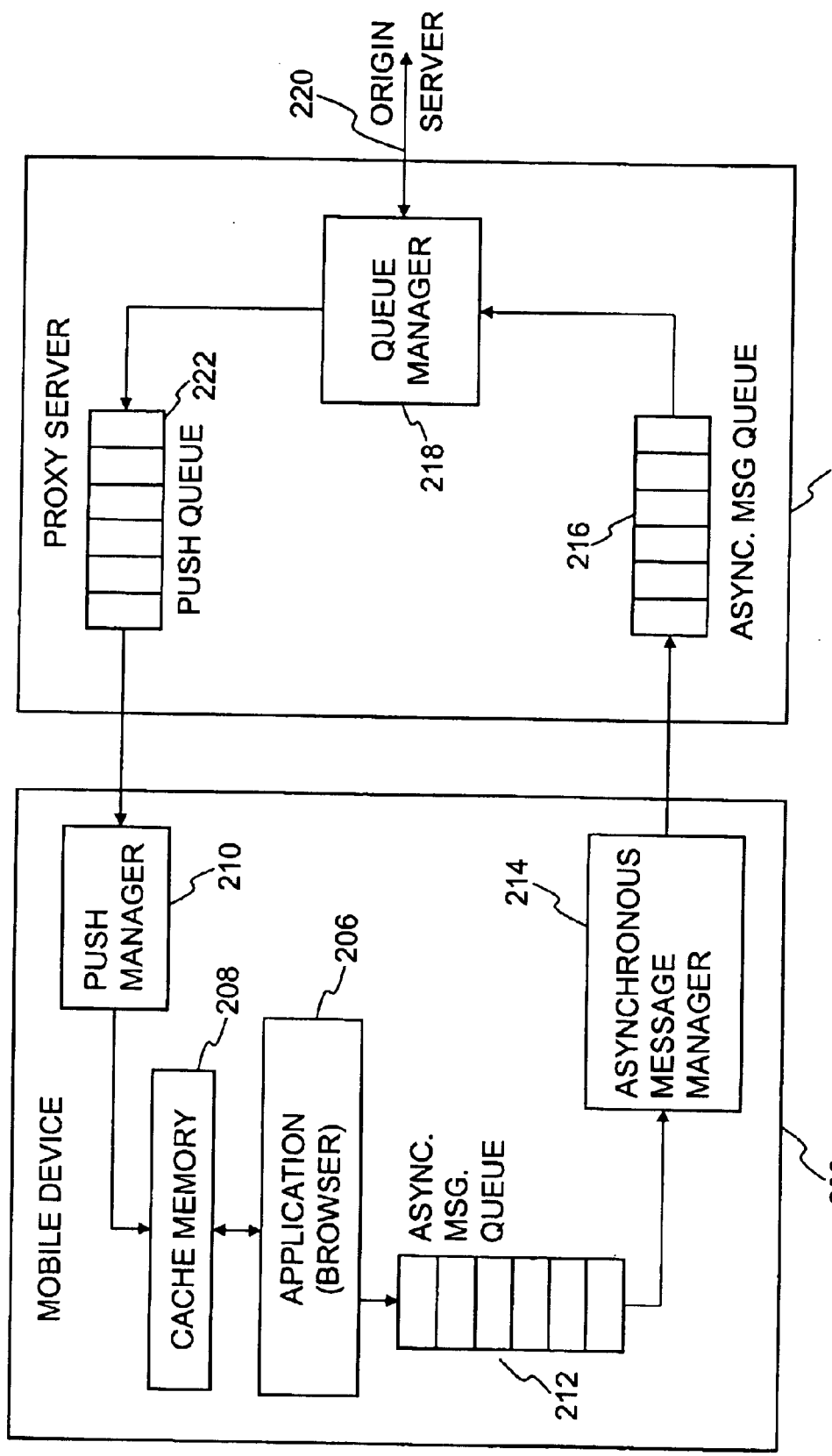
FIG. 2A is a block diagram of a communication system according to an embodiment of the first aspect the invention.

FIG. 2A is a block diagram of a communication system 200 according to one embodiment of the first aspect the invention. In this embodiment, the communication system 200 utilizes a proxy server between a mobile device and an origin server. Although the proxy server is advantageous, a communication system according to the invention could also operate without the proxy server.

The communication system 200 includes a mobile device 202 and a proxy server 204. The communication between the mobile device 202 and the proxy server 204 is through wireless communication channels of a wireless network. The wireless communication channels can be one-way channels or two-way channels. Among other things, the mobile device 202 includes an application 206 (i.e., a network browser), a cache memory 208, a push manager 210, an asynchronous message queue 212, and an asynchronous message manager 214.

The mobile device 202 communicates with the proxy server 204 to obtain resources from an origin server located on a remote network. The origin server contains information or resources that the mobile device 202 may desire. Initially, the application 206 (i.e., network browser) requests a resource that originates on the origin server. However, often the request need not be immediately serviced and thus can be performed in an asynchronous manner. Asynchronous means that the application 206 making the request does not wait to receive the resource; instead, the resource is to be acquired independent of further operation of the application 206. As an example, asynchronous requests are particularly useful in certain situations such as where an origin server (remote server) needs to eventually be updated with some event or action that has occurred on the mobile device 202, but the mobile device 202 does not need to wait until the origin server is updated before it continues.

Thus, where the request is asynchronous, the application 206 will forward the request to the asynchronous message queue 212. From the perspective of the application 206, once the request has been successfully queued, processing by the application 206 continues. Then, the asynchronous message manager 214 will manage the retrieval of messages (i.e., resource requests) from the asynchronous message queue 212 and their supply to the proxy server 204 over a wireless communication channel.

In one embodiment, the application 206 determines whether a particular request should be processed in an asynchronous manner or a synchronous manner. For example, program code of the application 206 can direct outgoing requests to the remote network to either a synchronous request manager or the asynchronous message manager 214. Only the asynchronous communication path is depicted in FIG. 2A because the synchronous path is conventionally available.

At the proxy server 204 the incoming asynchronous messages are temporarily stored in an asynchronous message queue 216. A queue manager 218 at the proxy server 214 operates to service the asynchronous message queue 216. The queue manager 218 forward the messages (i.e., requests) from the asynchronous message queue 216 to the appropriate origin server on the remote network over a network link 220. Reply messages from the origin server are directed through the queue manager 218 to a push queue 222. The push queue 222 stores the reply messages until they can be transmitted to the mobile device 202 over a wireless communication channel. The wireless communication channel can be a one-way channel or a two-way channel, but is often a one-way channel from the proxy server 204 to the mobile device 202.

With the wireless communication channel through the wireless network is available, the reply messages are transmitted from the push queue 222 to the push manager 210 of the mobile device 202 via the wireless communication channel. The push manager 210 then supplies the incoming reply messages to the cache memory 208. The push manager 210 can also notify the application 206 that the requested resource has been received. Additionally, the push manager 210 can also receive reply messages that are not stored in the cache memory 208 but are simply instead used to cause the mobile device 202 to perform some action at the mobile device 202. As an example, a reply message could instruct the mobile device 202 to alter the content of the cache memory 208 or to issue an alert to the user of the mobile device 202.

Figure 2B:
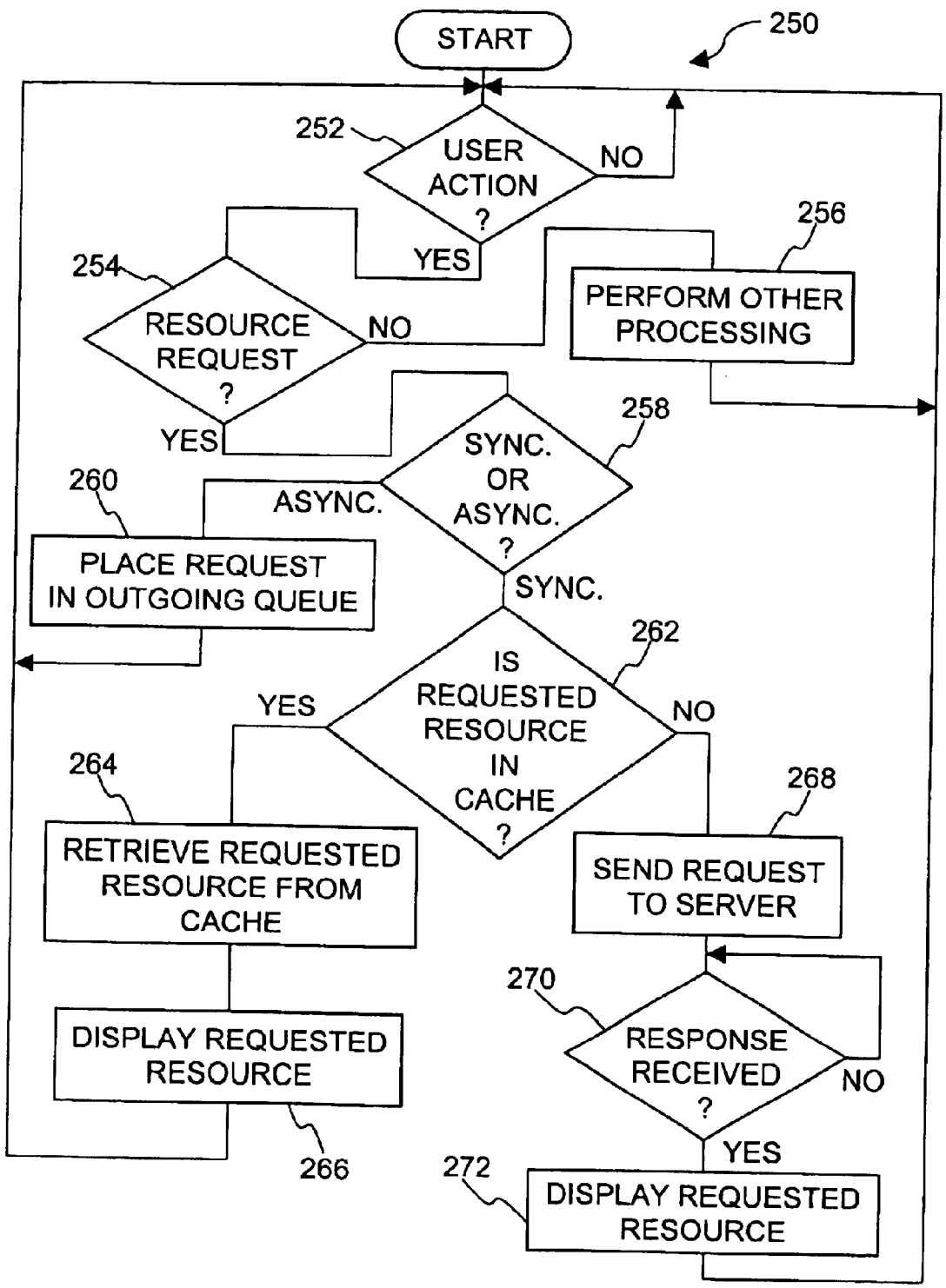
FIG. 2B is a flow diagram of mobile device integrated synchronous and asynchronous processing according to an embodiment of the invention.

FIG. 2B is a flow diagram of mobile device integrated synchronous and asynchronous processing 250 according to an embodiment of the invention. The mobile device integrated synchronous and asynchronous processing 250 is, for example, performed by the application 102 illustrated in FIG. 1.

The mobile device integrated synchronous and asynchronous processing 250 begins with a decision block 252 that determines whether a user action has occurred. When the decision block 252 determines that a user action has not occurred, then the mobile device integrated synchronous and asynchronous processing 250 simply awaits the occurrence of a user action. However, once the decision block 252 determines that a user action has occurred, then a decision block 254 determines whether the user action is a resource request. When the decision block 254 determines that the user action is not a resource request, then the mobile device integrated synchronous and asynchronous processing 250 operates to perform 256 other processing. The various types of other processing are not associated with the invention. For example, the other processing may include navigation operations with respect to a user interface of the mobile device. Following block 256, the mobile device processing 250 returns to repeat the decision block 252 and subsequent blocks to process additional user actions.

On the other hand, when the decision block 254 determines that the user action is a resource request, then a decision block 258 determines whether the request is designated to be a synchronous type of request or an asynchronous type of request. As will be discussed below, the designation of synchronous or asynchronous types can be provided by an application developer in creating the application so that the desired operation can be controlled. In any event, when the decision block 258 determines that the requested resource is of an asynchronous type, then the request is placed 260 in an outgoing queue. The outgoing queue is, for example, the asynchronous message queue 112 illustrated in FIG. 1 or the asynchronous message queue 212 illustrated in FIG. 2A. Following block 260, the mobile device integrated synchronous and asynchronous processing 250 returns to repeat the decision block 252 and subsequent blocks so that additional user actions can be processed.

Alternatively, when the decision block 258 determines that the request is of a synchronous type, then a decision block 262 determines whether the request resource is present in a cache memory (e.g., the cache memory 104, 208). When the decision block 262 determines that the requested resource is in the cache memory, then the requested resource is retrieved 264 from the cache memory. The requested resource is then displayed 266 on a display screen of the mobile device. Following block 266, the mobile device integrated synchronous and asynchronous processing 250 returns to repeat the decision block 252 and subsequent blocks so that additional user actions can be processed.

On the other hand, when the decision block 262 determines that the requested resource is not in the cache memory, then the request is sent 268 to a server. The server can be a server machine coupled to a remote network, such as a proxy server or a remote content server. Next, a decision block 270 determines whether a response to the request has been received from the server. When the decision block 270 determines that a response has not yet been received, then the mobile device integrated synchronous and asynchronous processing 250 awaits the response to arrive. While waiting for the response, the user is waiting because a synchronous type of request causes the application program to wait for the response to the request before continuing. Once the response has been received, the requested resource is displayed 272. Additionally, in certain embodiments, the requested resource would also be stored in the cache memory upon being received. Following block 272, the mobile device integrated synchronous and asynchronous processing 250 returns to repeat the decision block 252 and subsequent blocks so that additional user actions can be processed.

While blocks 262 and 272 pertain to displaying of requested resources that have be received by the mobile device, these operation are not needed in many embodiments. As an example, the application program may occasionally desire to issue a request but not display the received request. Instead, the response can signal some other type of response at the mobile device (e.g., notification, a list command, a cache operation, or other action).

As noted above, the designation of synchronous or asynchronous types can be provided by an application developer in creating the application so that the desired operation can be controlled. With a wireless markup language (WML) programmed application for use on a mobile device, an example of application code that issues an asynchronous request is as follows:

```
<ASYNC METHOD=POST URL="/code/del.cgi">
    <FIELD NAME="items" VALUE="$ITEMS"/>
</ASYNC>
```

The prefix "ASYNC" indicates that asynchronous message transfer is to be used. The method used is a POST method. The Universal Resource Locator (URL) is the location at a remote server where the message is to be sent. The variable "$ITEMS" in the items field contains a delimited list of items to be deleted.

In contrast, an example of application code that issues a synchronous request is as follows:

```
<GO URL="/channel/msg.wml">
    VAR NAME="from" VALUE=joe@xyz.com/>
    VAR NAME="subject" VALUE="lunch?"/>
    VAR NAME="msg" VALUE="Are you available for
        lunch today?"/>
</GO>
```

Note that no "ASYNC" prefix is used. Hence, it is assumed that synchronous message transfer is to be used. Here, the message pertains to an e-mail message that is supplied to the URL which handles the delivery of the message. The data for the e-mail message is sent with the request to the designated URL.

Figure 3:
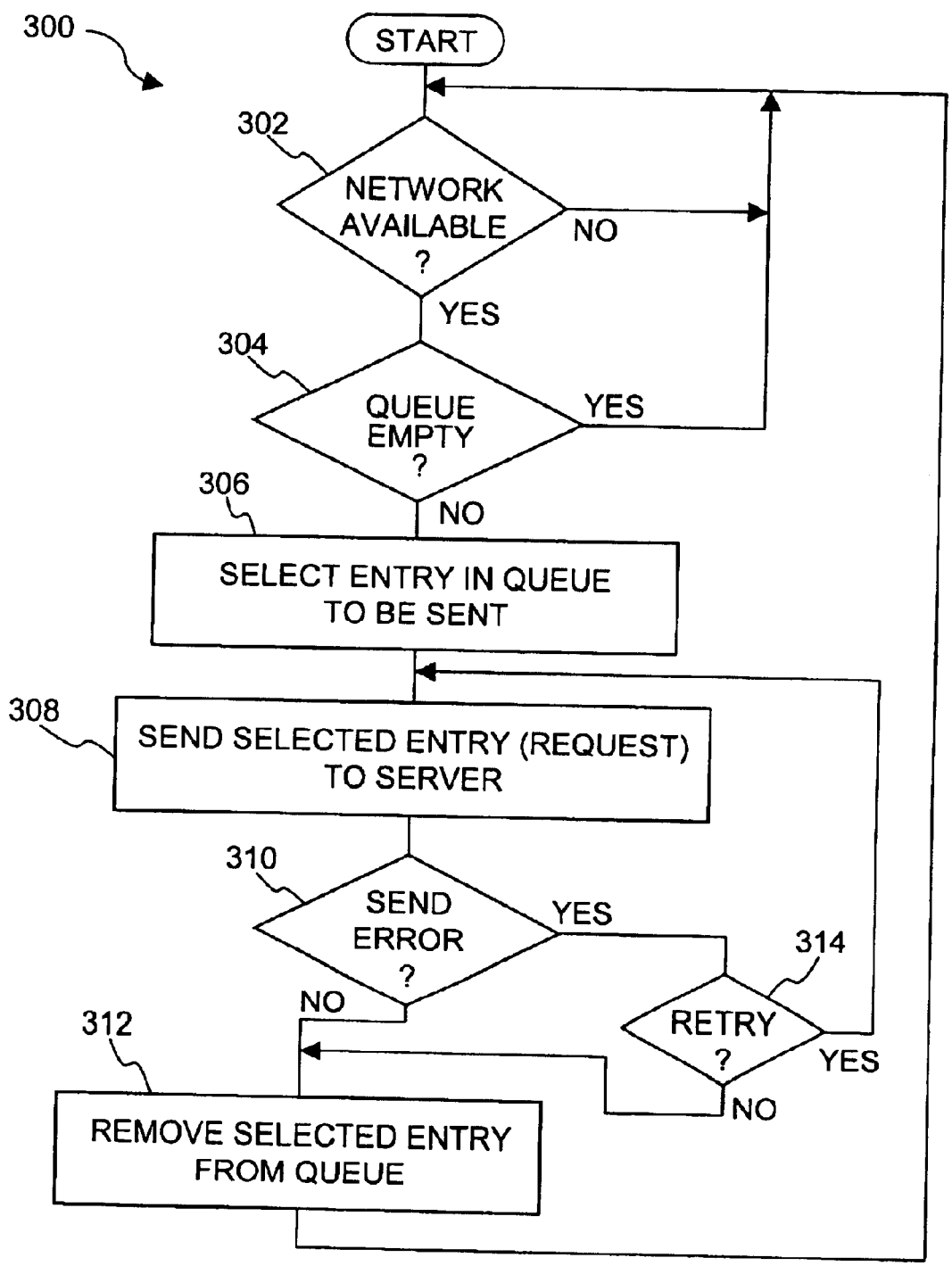
FIG. 3 is a flow diagram of asynchronous message send processing according to an embodiment of the invention.

FIG. 3 is a flow diagram of asynchronous message send processing 300 according to an embodiment of the invention. The asynchronous message send processing 300 is, for example, performed by the asynchronous message manager 110 illustrated in FIG. 1 or the asynchronous message manager 214 illustrated in FIG. 2A.

The asynchronous message send processing 300 begins with a decision block 302 that determines whether a wireless network is available to the mobile device. Wireless networks often have sporadic connectivity or high latency due to out-of-range, congestion, etc. and thus are temporarily unavailable to mobile devices. When the decision block 302 determines that the wireless network is not available, then the asynchronous message send processing 300 simply awaits the availability of the wireless network. Once the wireless network becomes available, then a decision block 304 determines whether an asynchronous message queue is empty. The asynchronous message queue is within the mobile device and is, for example, the asynchronous message queue 112 illustrated in FIG. 1 or the asynchronous message queue 112 illustrated in FIG. 2A.

When the decision block 304 determines that the asynchronous message queue is empty, then the asynchronous message send processing 300 returns to repeat the decision block 302 and subsequent blocks because there is presently no message waiting to be processed in the asynchronous message queue. On the other hand, when the asynchronous message queue is not empty, then an entry in the asynchronous message queue that is to be sent is selected 306. The selected entry in the asynchronous message queue is then sent 308 to a server via the wireless network. The server can be a proxy server or a remote server on a remote network. Typically, the selected entry is a request for a resource located at the server on the remote network.

After sending the selected entry to the server, a decision block 310 determines whether a send error has occurred. In other words, the decision block 310 waits for an acknowledgment that the server has received the selected entry that has been sent. When the decision block 310 determines that no send error occurred during the sending of the selected entry to server, then the selected entry is removed 312 from the asynchronous message queue. On the other hand, when the decision block 310 determines that a send error has occurred, a decision block 314 determines whether a retry is desired to resend the selected entry to the server. When the decision block 314 determines that a retry is desired, then processing returns to repeat block 308 and subsequent blocks. Alternatively, when the decision block 314 determines that a retry is not desired, then processing to the block 312. Following block 314, the asynchronous send processing 300 returns to repeat the decision block 302 and subsequent blocks so that additional entries in the queue can be processed.

Figure 4:
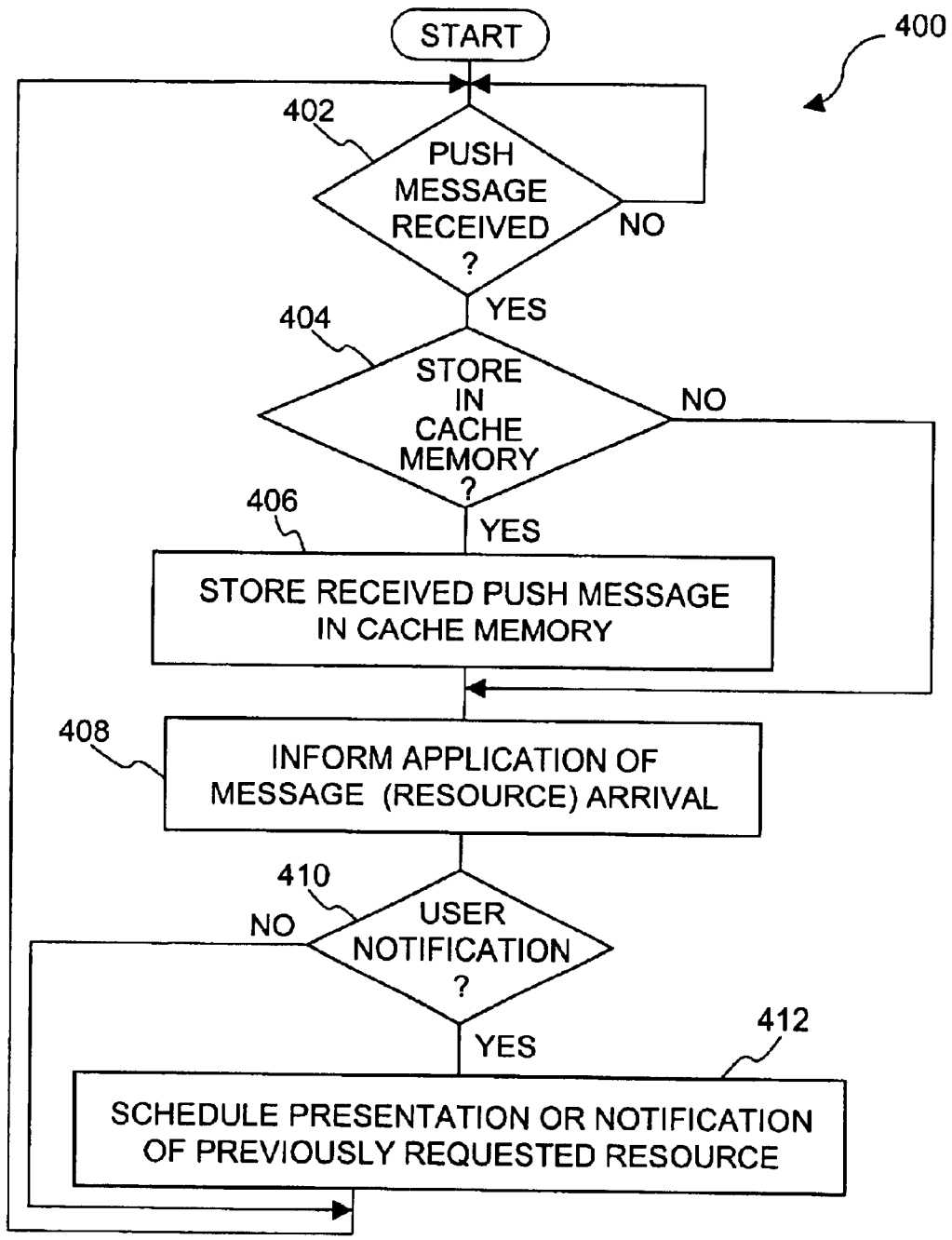
FIG. 4 is a flow diagram of asynchronous response receive processing 400 according to an embodiment of the invention.

FIG. 4 is a flow diagram of asynchronous response receive processing 400 according to an embodiment of the invention. The asynchronous response receive processing 400 is, for example, performed by the push manager 114 illustrated in FIG. 1 or the push manager 210 illustrated in FIG. 2A.

The asynchronous response receive processing 400 begins with a decision block 402 that determines whether a push message has been received. In one embodiment, a push engine at the proxy server 204 sends a push message obtained from the push queue 222 to the push manager 210 of the mobile device 202 via a wireless communication channel of the wireless network. When the decision block 402 determines that a push message has not been received, then the asynchronous response receive processing 400 simply awaits the reception of a push message. Once the decision block 402 determines that a push message has been received, a decision block 404 determines whether the received push message is to be stored in a cache memory. The cache memory is, for example, the cache memory 104 illustrated in FIG. 1 or the cache memory 208 illustrated in FIG. 2A. When the decision block 404 determines that the received push message should be stored in the cache memory, then the received push message is stored 406 in the cache memory. On the other hand, when the decision block 404 determines that the received push memory should not be stored in the cache memory, then block 406 is bypassed.

Next, the application is informed 408 of the message arrival. Typically, the message is a resource that was previously requested by the application. Hence, often the application is interested in being informed of its arrival. Following block 408, a decision block 410 determines whether user notification is desired. When the decision block 410 determines that user notification is desired, the presentation or notification of the previously requested resource is scheduled 412 on the mobile device. Here, the presentation or notification can take a variety of forms, including triggering an audio notification to the user that a previously requested resource is now available or providing a visual notification on a display device of the mobile device. On the other hand, when the user notification 410 determines that user notification is not desired, then block 412 is bypassed. Following block 412, the asynchronous response receive processing 400 has completed its processing of the received push message, and thus returns to repeat the decision block 402 and subsequent blocks so that additional received push messages can be processed.

The second aspect of the invention pertains to the use of content channels with a mobile device. The content channels facilitate disconnected operation of a mobile device from a wireless network. In particular, by loading content channels into a cache memory of the mobile device before they are needed, the mobile device is less likely to need to access the wireless network. In the case where the wireless network has high-latency or sporadic connectivity, this aspect is particularly useful. The second aspect of the invention is described in greater detail below with respect to FIGS. 5–7E.

Figure 5:
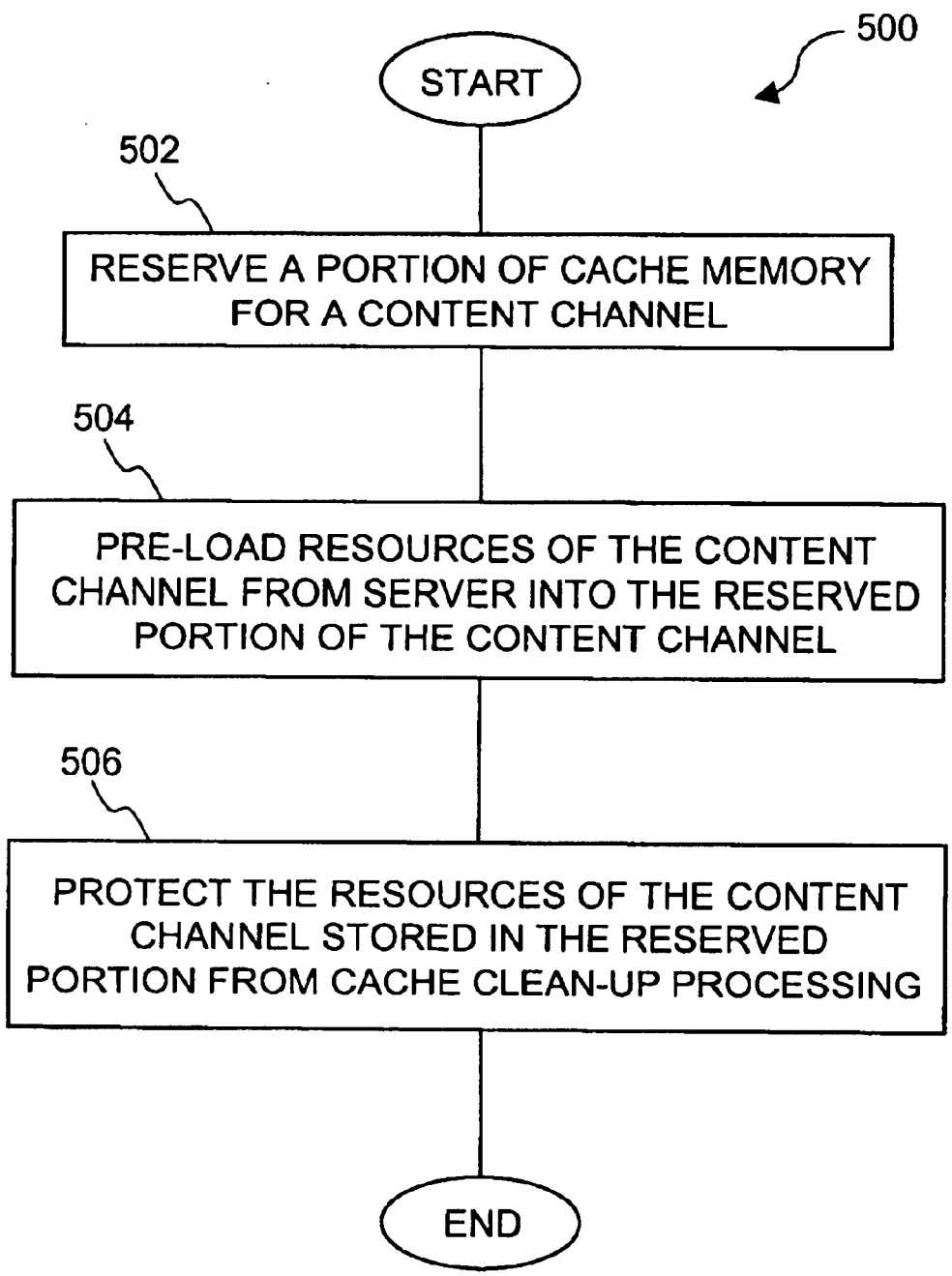
FIG. 5 is a flow diagram of basic channel initialization processing according to an embodiment of the invention.

FIG. 5 is a flow diagram of basic channel initialization processing 500 according to an embodiment of the invention. The basic channel initialization processing 500 is, for example, performed by the channel manager 116 illustrated in FIG. 1.

The basic channel initialization processing 500 reserves 502 a portion of a cache memory for a content channel. The portion of the cache memory of a mobile device is reserved for storage of the content channel. As an example, the cache memory can be the cache memory 104 illustrated in FIG. 1. The reservation of a portion of the cache memory serves to dedicate the portion of the cache memory to the storage of content channels, and thus ensures that resources from content channels will able to be stored in the mobile device. Next, resources of the content channel are pre-loaded 504 from a server into the reserved portion of the content channel. Here, in the background processing or initial provisioning processing, the resources associated with the content channel are loaded into the reserved portion of the cache memory so that an application can later rapidly retrieve any of the content associated with the content channel. These resources are able to be rapidly retrieved because they are located locally within the cache memory and thus no external request to a remote server through the wireless network is needed.

Additionally, the resources of the content channel that are stored in the reserved portion of the cache memory (RAM) are protected 506 from cache clean-up or refresh processing. In this regard, the resources associated with the content channel are not subjected to removal from the cache memory or clean-up algorithms which could otherwise over-write or remove the resources of the content channel from the cache memory. In other words, the resources associated with the content channel remain in the cache memory until they are specifically instructed to be removed or refreshed. In other words, the reserved portion of the cache memory provides persistent storage. Following block 506, the basic channel initialization processing 500 is complete and ends.

During operation, a user of a mobile device is able to select from certain content channels that they wish to have resident locally on their mobile device. A mobile device can also be provisioned or pre-configured to request certain content channels. Content channels can offer a wide range of content to users. Some examples of content channels include: a stock channel, a sports channel, a traffic channel, etc. The ability to ensure that certain content channels exist on a mobile device is an important advantage because it enables the mobile device to perform processing that would require the contents of the content channels without regard to whether the wireless network is available. Hence, even when the network is not available, the mobile device is able to operate properly because the appropriate content channel has been pre-loaded on the mobile device.

Figure 6:
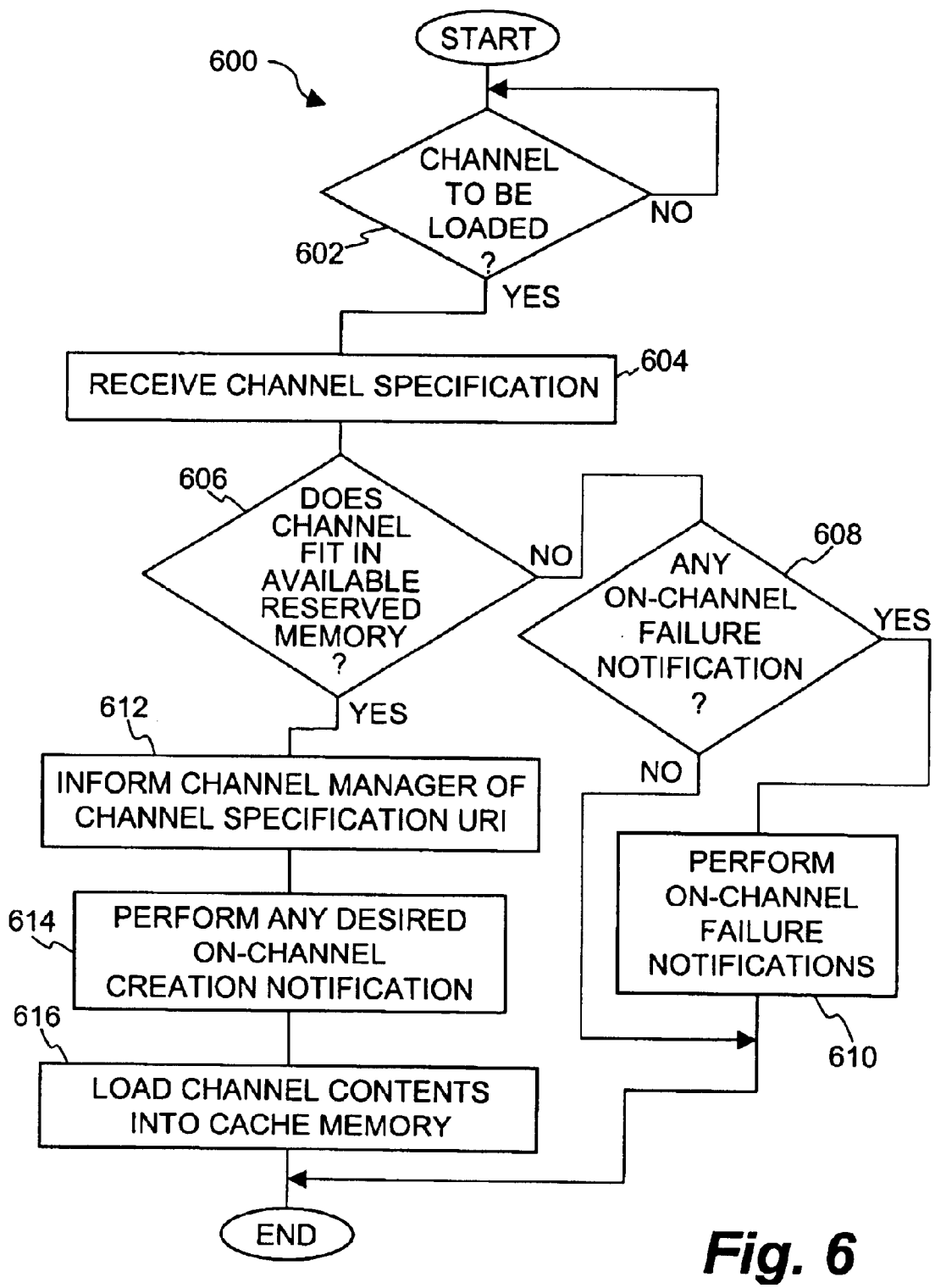
FIG. 6 is a flow diagram of out-of-band initialization processing according to an embodiment of the invention.

FIG. 6 is a flow diagram of out-of-band initialization processing 600 according to an embodiment of the invention. Out-of-band initialization pertains to initialization performed when a mobile device is provisioned for use. The out-of-band initialization processing 600 begins with a decision block 602 that determines whether a content channel is to be loaded. When the decision block 602 determines that no content channel is to be loaded, then the out-of-band initialization processing is not invoked. On the other hand, when the decision block 602 determines that a content channel is to be loaded, then a channel specification is received 604. A channel specification describes the content channel. Typically, the channel specification would be received from a remote server (e.g., a proxy server or a content server).

Next, a decision block 606 determines whether the particular content channel will fit in the available reserved memory. A channel specification specifies the amount of reserved memory it requires, and this amount can be compared with an available amount of memory space in the reserved portion of the cache memory for the storing of content channels. When the decision block 606 determines that the particular content channel does not fit in the available reserved memory, then a decision block 608 determines whether on-channel failure notifications are requested. When the decision block 608 determines that on-channel failure notifications are requested, then the on-channel failure notifications are performed 610. On the other hand, when the decision block 608 determines that no on-channel failure notifications are required, then the block 610 is bypassed. Following block 610, the out-of-band initialization processing 600 is complete and ends without loading the particular content channel in the cache memory.

On the other hand, when the decision block 606 determines that the particular content channel does fit in the amount of available reserved memory, a channel manager is informed 612 of the channel specification Universal Resource Identifier (URI). This allows the channel manager to setup the content channel. The channel manager is, for example, the channel manager 116 illustrated in FIG. 1. Next, any desired on-channel creation notifications are performed 614. Additionally, the channel contents are loaded 616 into the cache memory. The loading 616 of the channel content is performed either in a background mode or during initialization of a mobile device. Following block 616, the out-of-band initialization processing 600 is complete and ends.

Figure 7A:
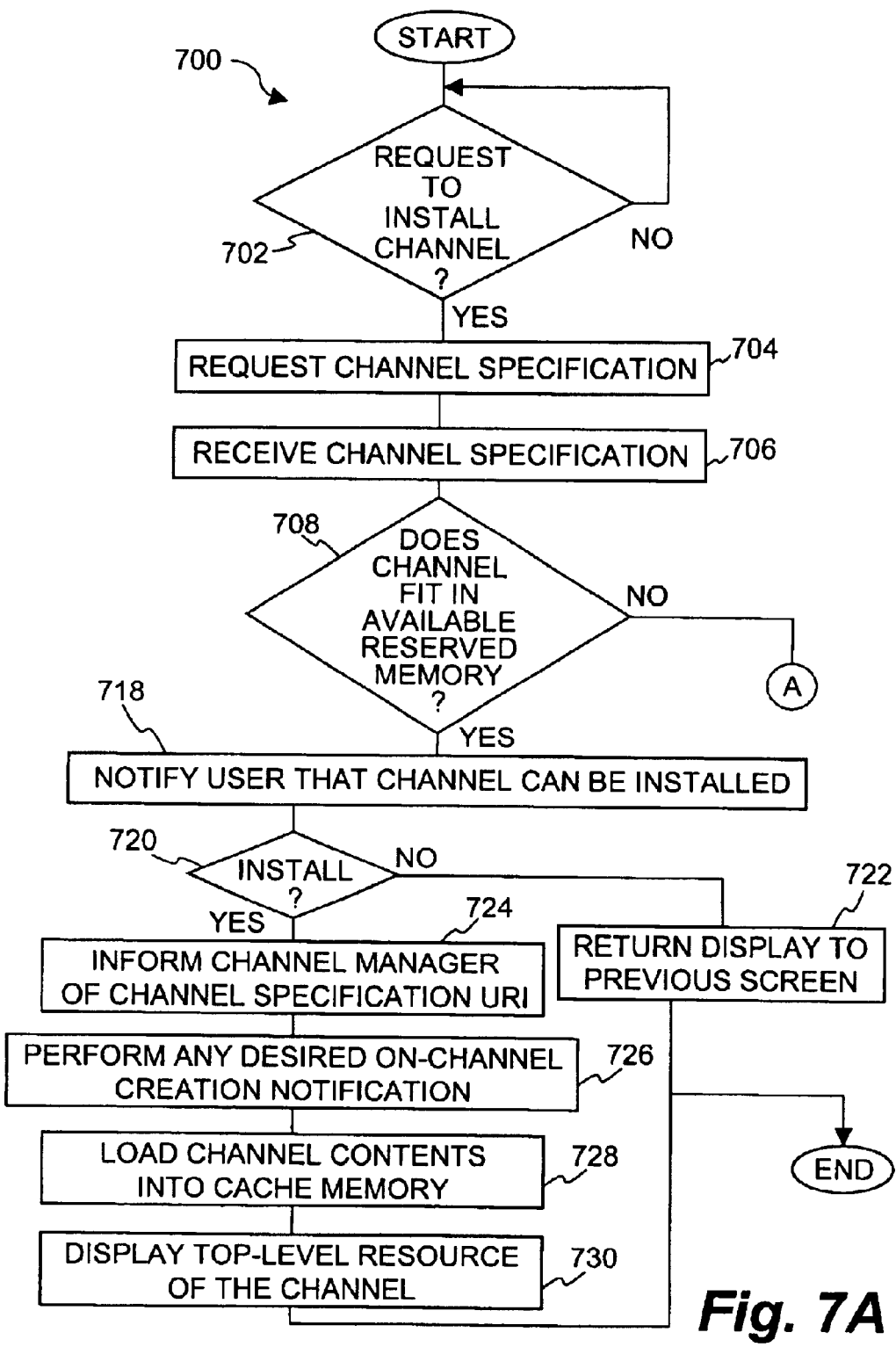
FIGS. 7A and 7B are flow diagrams of direct initialization processing according to an embodiment of the invention.
Figure 7B:
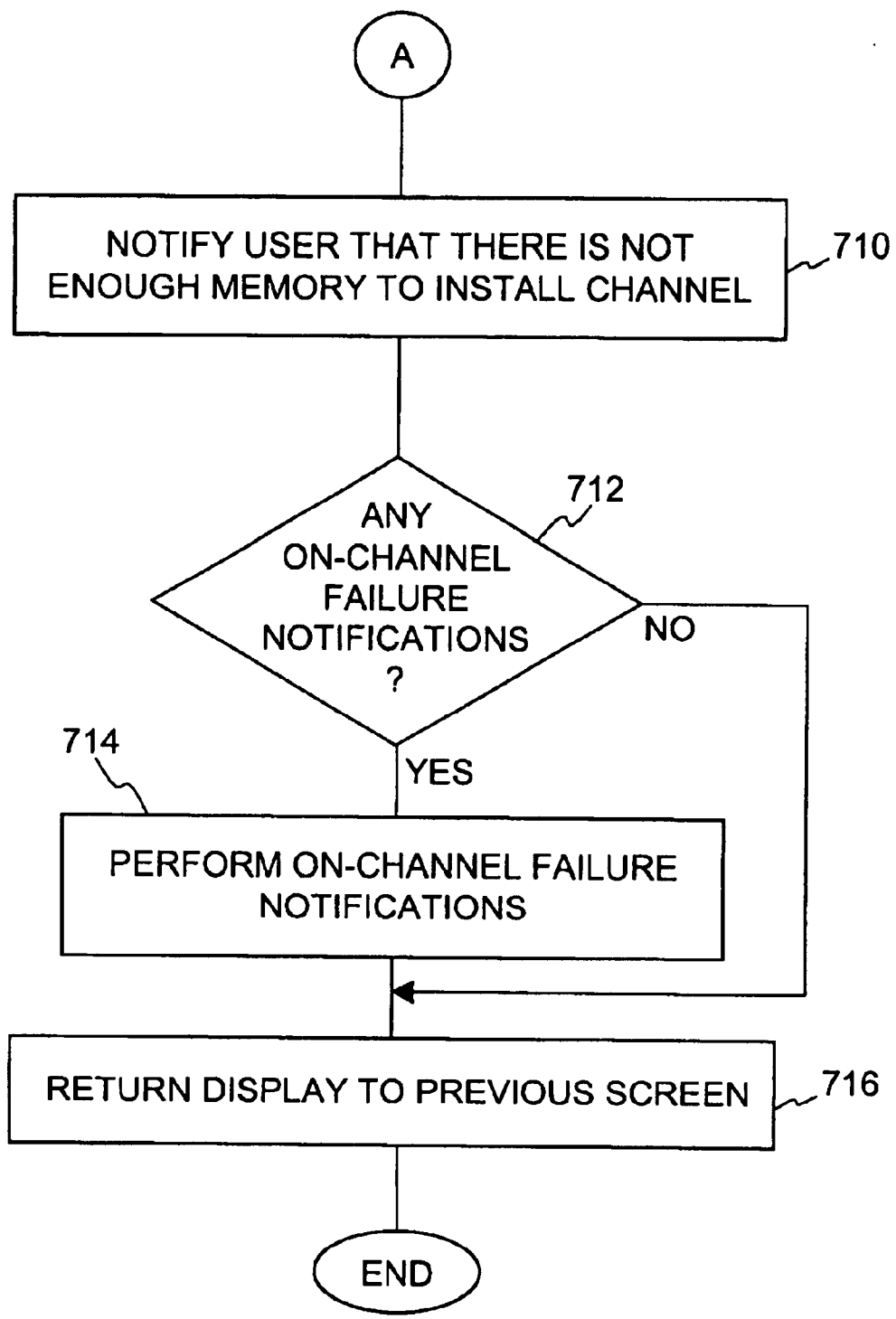
Figure 7C:
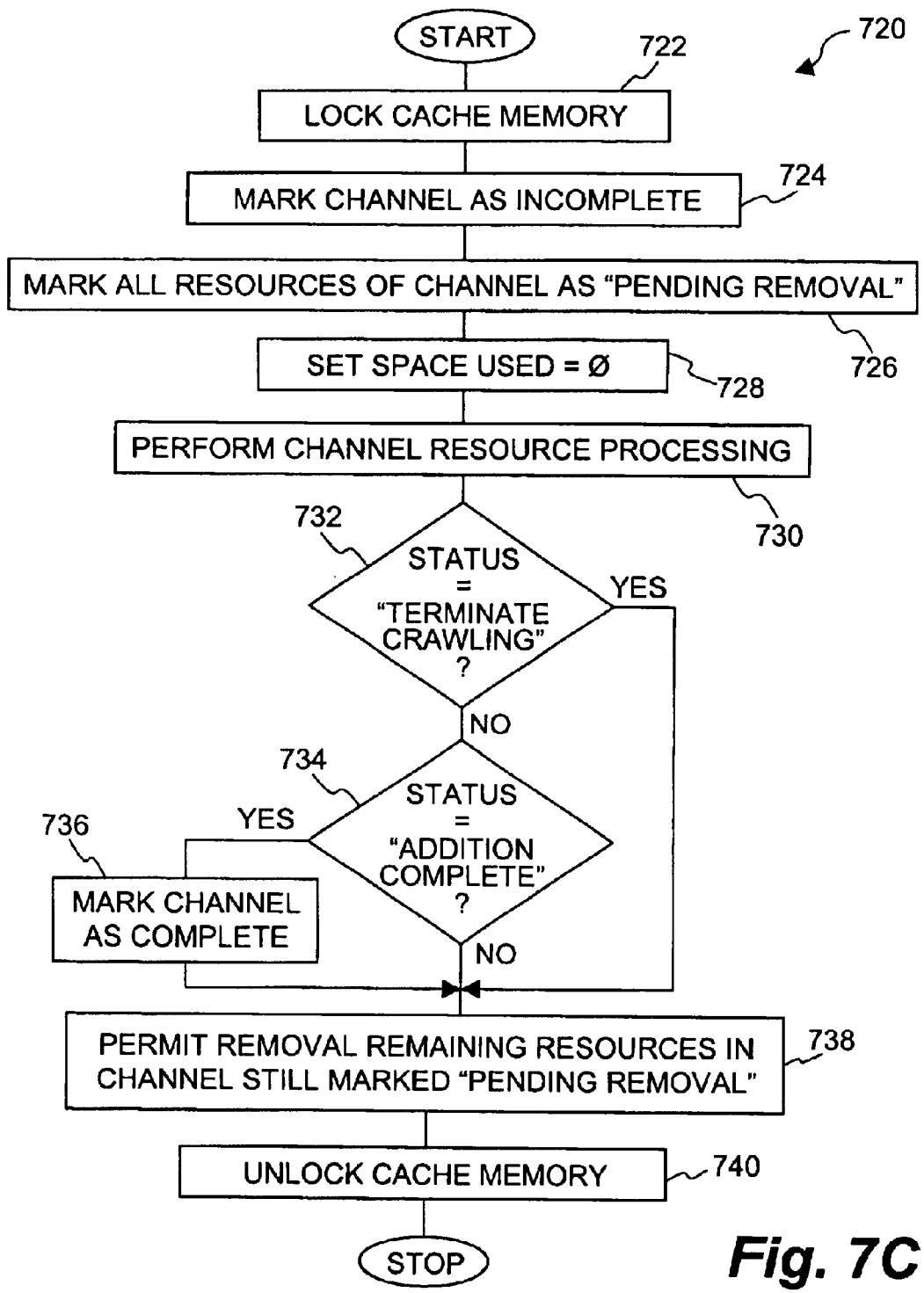

FIGS. 7A and 7B are flow diagrams of direct initialization processing 700 according to an embodiment of the invention. The direct initialization processing 700 is activated by a user request to install a particular content channel in a mobile device. As an example, the channel manager 116 illustrated in FIG. 1 is able to perform the direct initialization processing 700.

The direct initialization processing 700 begins with a decision block 702. The decision block 702 determines whether a request to install a content channel has been received. As long as such a request has not been received, the direct initialization processing 700 simply awaits the reception of such a request. Once the decision block 702 determines that a request to install a content channel has been received, then a channel specification is requested 704. The channel specification describes the content channel to be installed. After requesting the channel specification, the channel specification is received 706. The channel specification is typically received 706 from a remote server through the wireless network.

Next, a decision block 708 determines whether the content channel is able to fit in the available reserved memory of the cache memory. When the decision block 708 determines that the content channel does not fit in the available reserved memory, then a user is notified 710 that there is not enough memory to install the content channel. As an example, the notification can display a message on a display device of the mobile device. Then, a decision block 712 determines whether any on-channel failure notifications are requested. When the decision block 712 determines that there are on-channel failure notifications to be performed, the on-channel failure notifications are performed 714. Alternatively, when the decision block 712 determines that there are no on-channel failure notifications to be performed, the block 714 is bypassed. Next, the display associated with the mobile device is returned 716 to the previous screen prior to requesting the channel installation because the content channel has not been installed. Following block 716, the direct initialization processing 700 is complete and ends.

On the other hand, when the decision block 708 determines that the content channel does fit within the available reserved memory within the cache memory, then the user is notified 718 that the content channel can be installed. Next, a decision block 720 determines whether installation is still desired by the user. When installation is not confirmed by the user, then the direct installation processing 700 is aborted and the display associated with the mobile device is returned 722 to the previous screen prior to requesting the installation of the content channel. Following block 722, the direct initialization processing 700 is complete and ends.

Alternatively, when the decision block 720 confirms the initialization request, the channel manager is informed 724 of the channel specification URI. This allows the channel manager to setup the content channel. Then any desired on-channel creation notifications are performed 726. The contents of the channel are then loaded 728 into the reserved portion of the cache memory. After loading the content of the channel into the cache memory, the display device of the mobile device then displays 730 a top-level resource of the content channel that has been installed. Thereafter, the user of the mobile device is able to navigate through the contents of the channel as desired. Following block 730, the direct initialization processing 700 is complete and ends.

The initialization processing 600, 700 described above uses various notifications, including on-channel creation notification and on-channel failure notifications. These can be provided within the markup language file (e.g., XML) used to describe the content channel. Examples of notifications are OnChannelCreate, OnChannelFail, OnChannelDelete, and OnChannelOverflow. Typically, each of the notification types being used can have a designated URL where a message is to be sent. An example of which is as follows:

<HANDLE TYPE="OnChannelOverflow" HREF="/cgi-bin/channelOverflow.cgi"/>

The content channel is loaded into a reserved portion of the cache memory. This reserved portion of the cache memory can also be referred to as a channel storage section of the cache memory. The loading or pre-loading of the various resources of a channel is referred to as channel crawling. Hence, the loading associated with block 616 of FIG. 6 and with block 728 of FIG. 7A can be performed by channel crawl processing described below. Channel crawl processing generally operates to sequence through a resource (primary resource) and those resources that are linked to the primary resource. The primary resource is identified by a channel specification and is, for example, often presented as a URI.

FIGS. 7C–7F are flow diagrams of channel crawl processing 720 according to an embodiment of the invention. The channel crawl processing 720 initially locks 722 the cache memory. In effect, when locked, the cache memory becomes operable in a read-only manner. Next, the channel is marked 724 as being incomplete. Completeness in this context indicates that the entire channel is present in the cache memory. Hence, "incomplete" indicates that the entire channel is not present in the cache memory (namely, the channel storage section). In addition, all resources of the channel are marked 726 as "pending removal". Pending removal signifies that the particular resources of the channel are eligible to be removed if the channel crawling does not indicate that the resource should remain within the channel storage section of the cache memory. Next, a variable "space used" is set 728 to zero (0). The space used variable is used to count up the amount of space being consumed by a channel as resources are added to the channel. Typically, a channel specification will indicate a maximum amount of memory storage within the channel storage section) it is permitted to consume.

Next, channel resource processing is performed 730. The channel resource processing 730 is, for example, described with respect to FIGS. 7D–7F which describe channel resource processing. The channel resource processing operates to obtain (as needed) and assign resources of the channel into the channel storage section of the cache memory.

Following the channel resource processing 730, a decision block 732 determines whether the status is currently "terminate crawling" which indicates that the channel crawl processing 720 should end. When the decision block 732 determines that the status is not "terminate crawling," a decision block 734 determines whether the status is "addition complete". When the status is "addition complete," then the channel is marked 736 as being complete. Otherwise, the channel is assumed to be incomplete and processing continues.

Following the block 736, the decision block 734 when the status is not "addition complete," or the decision block 732 when the status is "terminate crawling," the channel crawl processing 720 has finished crawling through the channel and now is prepared to complete its processing. In particular, removal of the remaining resources in the channel that are still marked "pending removal" is permitted 738. Once the remaining resources are permitted 738 to be removed, the cache memory can remove them or write over them at a later time as is needed. Following block 738, the cache memory is unlocked 740. Once unlocked, the cache memory is available for use by various applications. Following block 740, the channel crawl processing 720 is complete and ends.

Figure 7D:
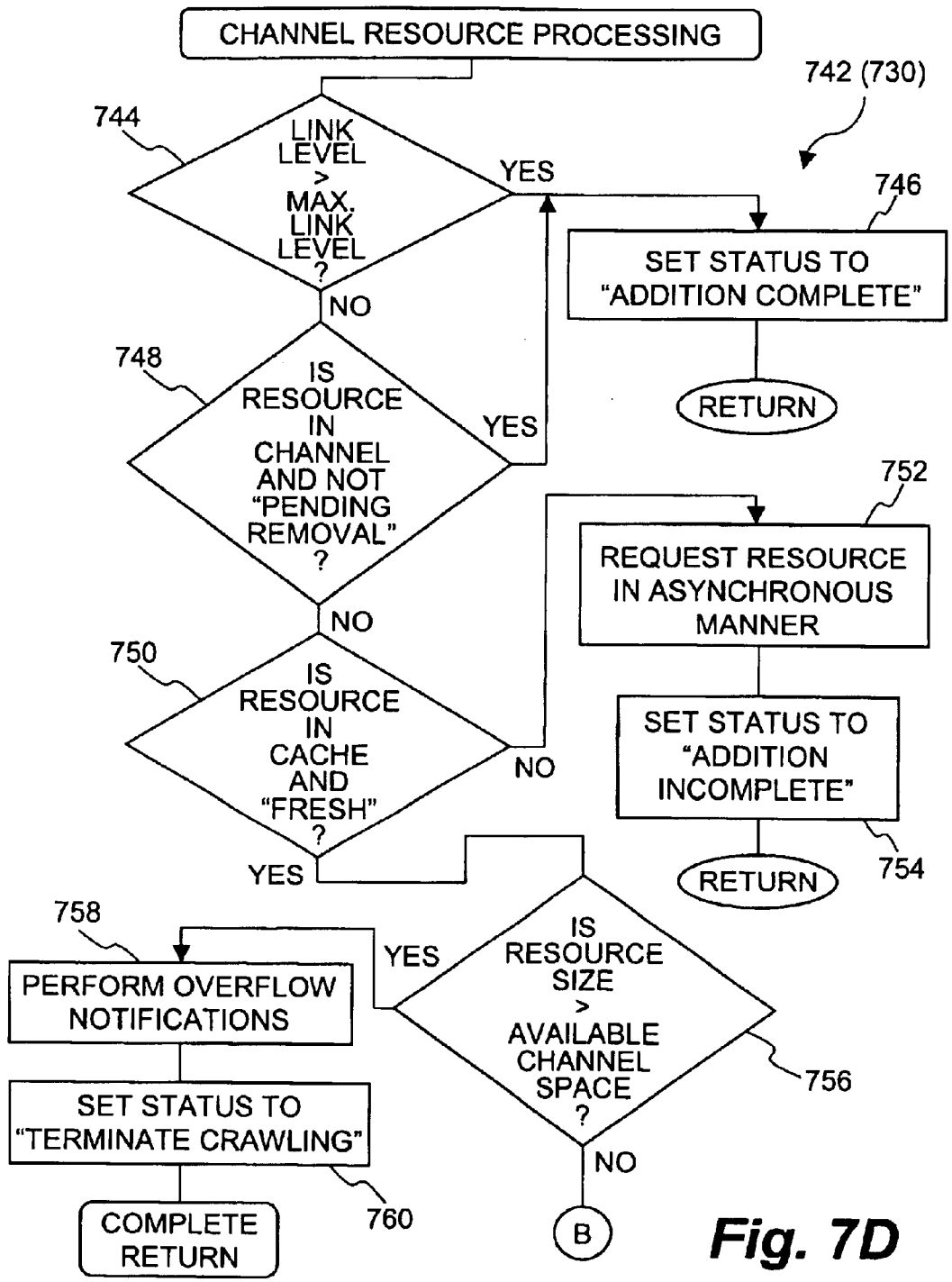
Figure 7E:
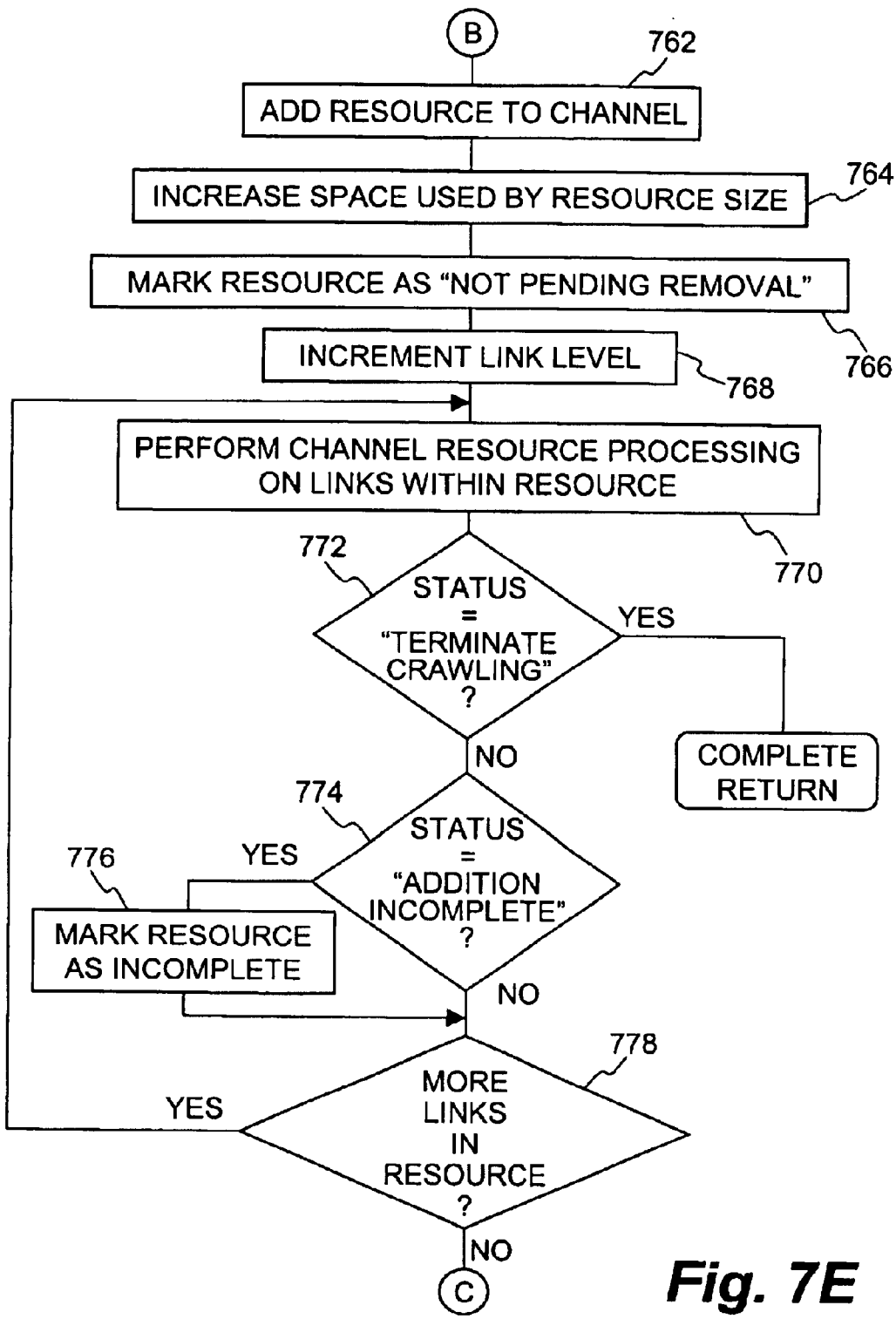
Figure 7F:
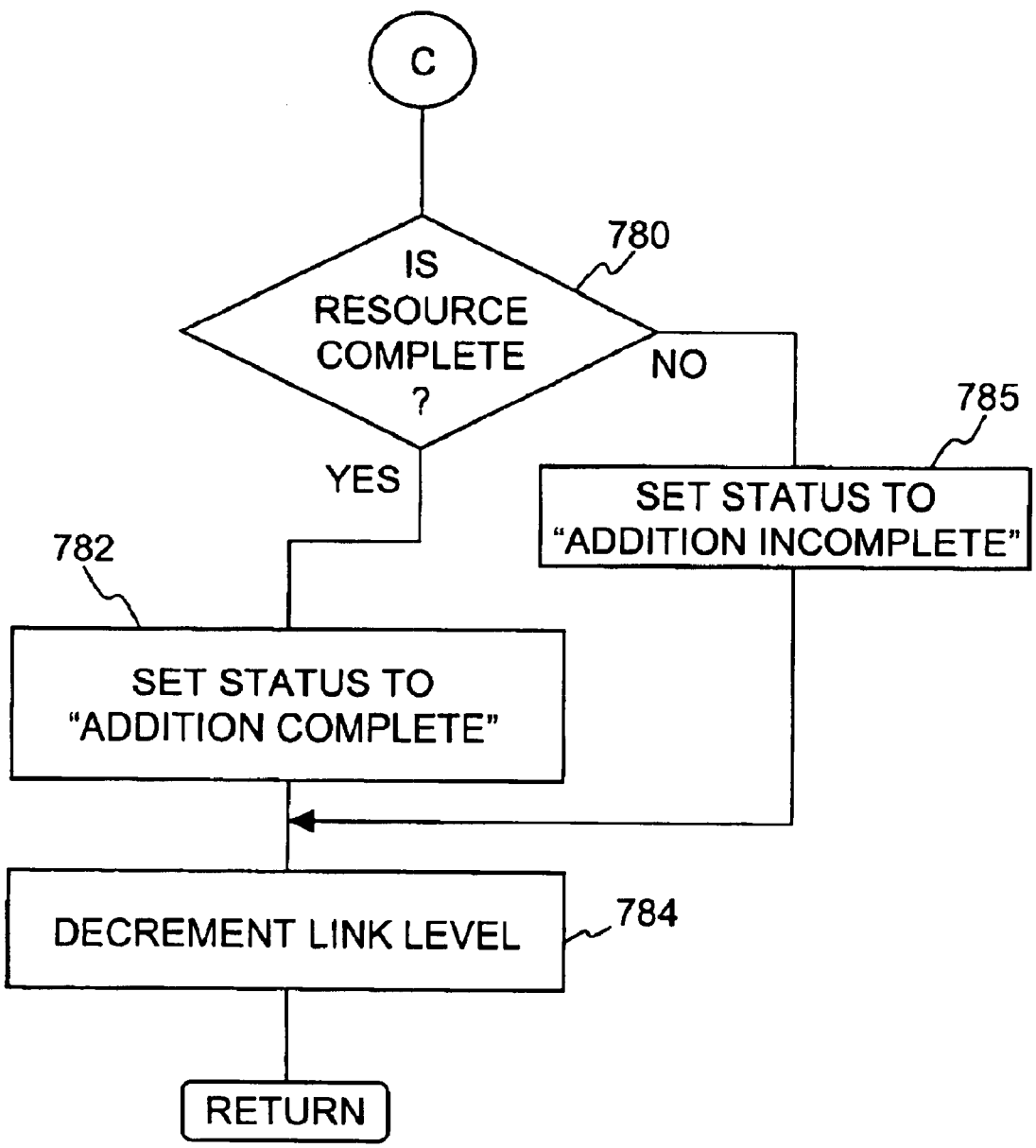

FIGS. 7D–7F are flow diagrams illustrating channel resource processing 742 according to an embodiment of the invention. The channel resource processing 742 pertains to an embodiment of the channel resource processing associated with block 730 in FIG. 7C.

The channel resource processing 742 initially begins with a decision block 744. The decision block 744 determines whether a link level is greater than a maximum link level. When the link level is greater than the maximum link level, then the status is set 746 to "addition complete". Following block 746, the channel resource processing 742 is complete and returns.

Alternatively, when the decision block 744 determines that the link level is not greater than the maximum link level, a decision block 748 determines whether the resource being processed is already in the channel and not designated "pending removal". When the decision block 748 determines that the resource is already in the channel and not designated "pending removal," then the channel resource processing 742 understands that the resource has been previously processed. Hence, in this case, the channel resource processing 742 also sets 746 the status to "addition complete" and then returns.

On the other hand, when the decision block 748 determines that the resource is either not in the channel or not "pending removal", then a decision block 750 determines whether the resource is in the cache memory and also "fresh". As an example, entries in a cache memory are "fresh" when their expiration date has not been exceeded. When the decision block 750 determines that the resource is not both in the cache and "fresh", then the resource is requested 752 in an asynchronous manner. Asynchronous requests of this type were discussed above and allow the processing to proceed without waiting for the resource. Next, the status is set 754 to "addition incomplete". Following block 754, the channel resource processing 742 is complete and returns.

Alternatively, when the decision block 750 determines that the resource is both in the cache and "fresh", then a decision block 756 determines whether the resource size is greater than the available channel space. Here, the decision block 756 is determining whether the particular resource being processed is able to fit within the available channel space that has been allocated for storage of the channel. The available channel space is determined from the space used variable. When the decision block 756 determines that the resource size is greater than the available channel space, then overflow notifications are performed 758. Then, the status is set 760 to "terminate crawling". Following block 760, the channel resource processing 742 is complete and completely returns to the channel crawl processing 720 (at the decision block 732).

On the other hand, when the decision block 756 determines that the resource size is not greater than the available channel space, then the resource is added 762 to the channel. Then, the space used variable is increased 764 by the resource size. The resource stored in the channel portion of the cache memory is also marked 766 as "not pending removal". In effect, this places the resource in the channel storage section of the cache memory where it is protected. Next, the link level is incremented 768. The link level indicates the level of the channel which is being currently processed. Although not shown, all returns described also decrement the link level. Complete returns actually return to the initial level and set the link level accordingly.

At this point, the base level resource has been processed. Next, the channel response processing 742 operates to process the links to other resources that are embedded within the primary resource. This processing of the links is performed in a recursive manner as is detailed below.

The channel resource processing 742 performs channel resource processing 770 on links within the resource. Hence, at this point, for a link within the resource, the processing returns in a recursive manner to repeat the channel resource processing 742 beginning at block 744. When a return occurs, the processing will be exiting the block 770 in FIG. 7E. However, prior to that, the links are crawled down (via its links) to maximum level so as to bring in the corresponding resources into the channel. Once the processing exits the block 770, a decision block 772 determines whether the status is "terminate crawling." When the decision block 772 determines that the status is "terminate crawling," then the channel resource processing 742 completely returns to the channel crawl processing 720 where it will be exiting block 730 in FIG. 7C.

On the other hand, when the decision block 772 determines that the status is not "terminate crawling," a decision block 776 determines whether the status is "addition incomplete." When the decision block 776 determines that the status is "addition incomplete," then the resource is marked 776 as incomplete. Following the decision block 776 when the status is not "addition incomplete," a decision block 778 determines whether there are more links in the resource to be processed. If the decision block 778 determines that there are more links to be processed, then processing returns to repeat block 770 and subsequent blocks.

On the other hand, when the decision block 778 determines that there are no more links in the resource to be processed, then a decision block 780 determines whether the resource being processed is complete. When the decision block 780 determines that the resource is complete, then the status is set 782 to "addition complete." Then, following block 782, the channel resource processing for the particular link, the link level is decremented 784. Following block 784, the channel resource processing 742 returns. Here, the channel resource processing 742 is returning up one level where processing will continue. Alternatively, when the decision block 780 determines that the resource is not complete, then the status is set 785 to "addition incomplete," Then the link level is decremented 784. Following block 784, the channel resource processing 742 for the particular link is complete and thus returns to the prior level.

As described above in the channel resource processing 742, when resources are not available in the cache, or the resources are "stale" if they are in the cache, asynchronous requests for the resources are made. Here, the asynchronous requests are forwarded to a remote server and a reply from the remote server forwards the requested resource back to the mobile device that has issued the request. When such incoming requests are received by the mobile device, they are processed as described below with respect to FIG. 7G.

Figure 7G:
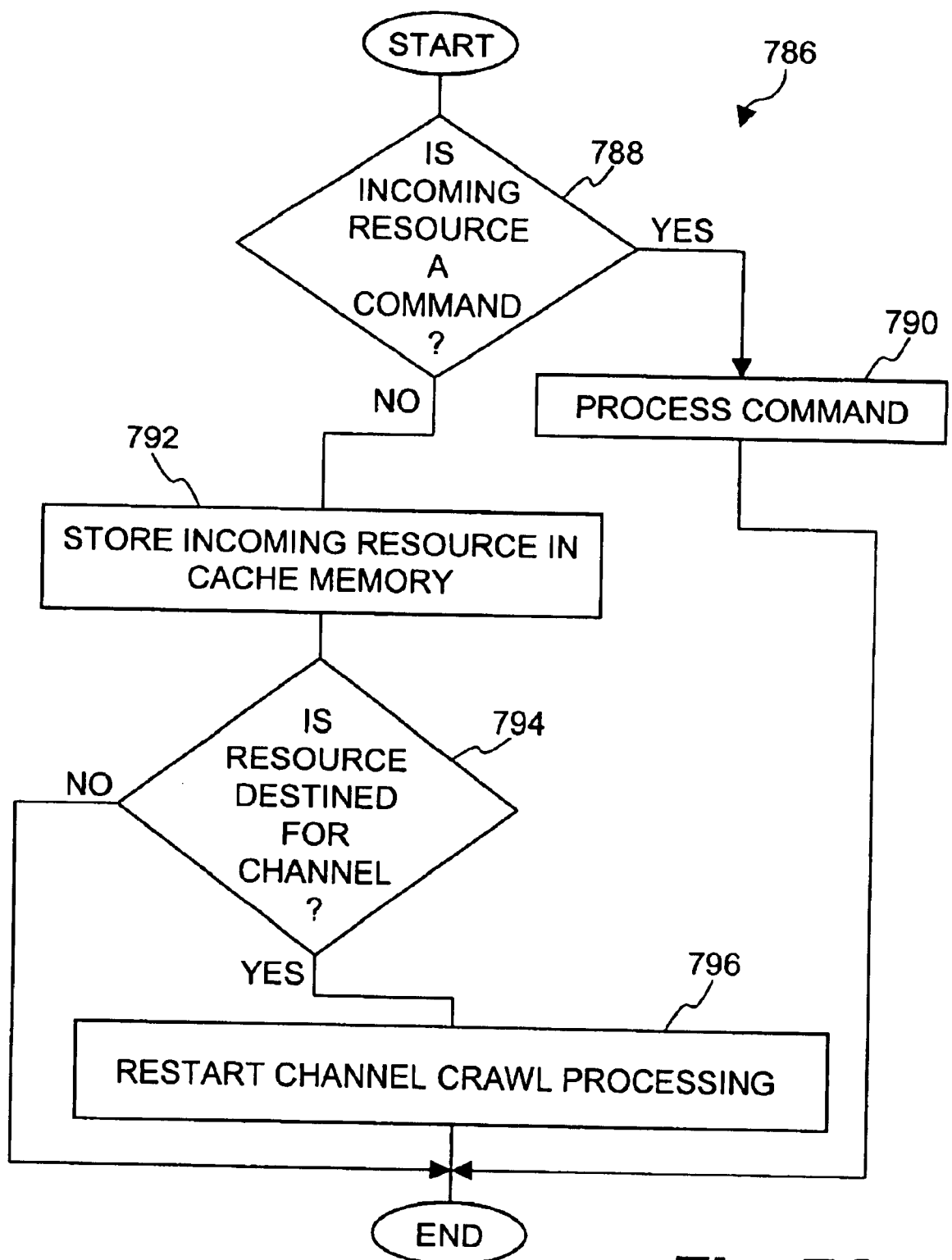

FIG. 7G is a flow diagram of asynchronous request completion processing 786 according to an embodiment of the invention. The asynchronous request completion processing initially begins with a decision block 788. The decision block 788 determines whether the incoming resource (i.e., the requested resource) is a command. When the decision block 788 determines that the incoming resource is a command, then the command is processed 790. Here, the processing of commands is separate from the processing of resources that were previously requested such as during the channel crawl processing. Following block 790, the asynchronous request completion processing is complete and ends because, in such case, the incoming resource was a command that was received and not a resource that was previously asynchronously requested.

On the other hand, when the decision block 788 determines that the incoming resource is not a command, then it is assumed that the incoming resource is a resource that was previously asynchronously requested by the mobile device (e.g., asynchronous message manager 110 or 214). Hence, the incoming resource is stored 792 in the cache memory. Then, a decision block 794 determines whether the incoming resource is destined for the channel (i.e., for the channel storage section of the cache memory). Here, the asynchronous request completion processing 786 determines whether the incoming resource is part of a channel that is to be provided on the mobile device. When the incoming resource is destined for a channel, then the channel crawl processing is restarted 796 to determine whether the incoming resource can be added to the channel. In one embodiment, the restarting of the channel crawl processing is utilized to cause the channel to be updated in accordance with the incoming resource as well as to generally update its status and resources. Alternatively, when the resource is not destined for a channel, the block 796 is bypassed. Following block 796, as well as following the decision block 794 when the resource is not destined for a channel, the asynchronous request completion processing 786 is complete and ends.

The third aspect of the invention pertains to improved list processing within mobile devices such that lists can be manipulated without server interaction. Accordingly, improved operation of mobile devices results because list processing can be performed even during periods of network unavailability. The third aspect of the invention is described in greater detail below with respect to FIGS. 8–10.

Figure 8:
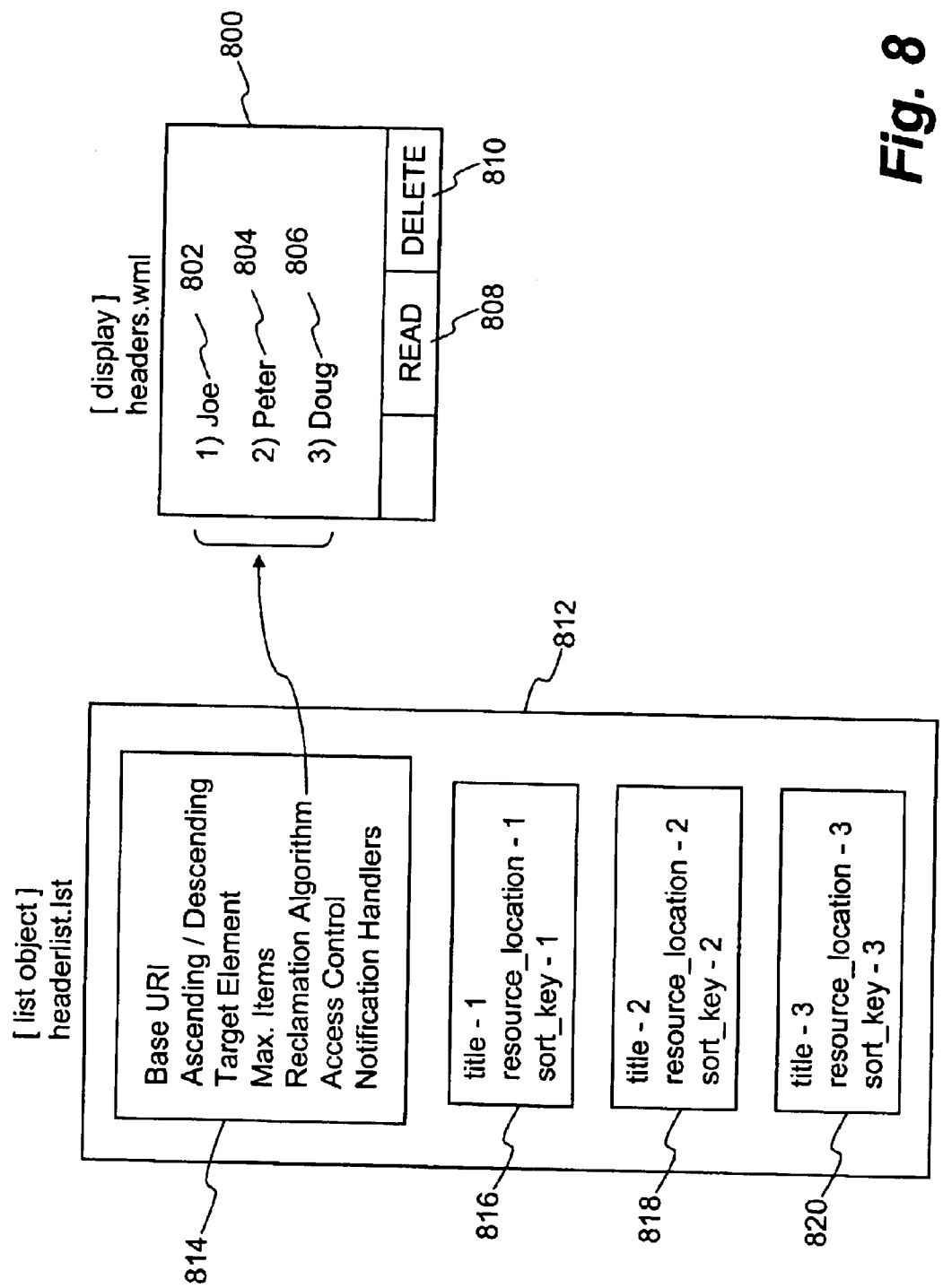
FIG. 8 is a diagram of a user interface having a displayed list according to an embodiment of the invention.

FIG. 8 is a diagram of a user interface having a displayed list 800 according to an embodiment of the invention. The displayed list 800 is, for example, displayed on a display screen (display device) of a mobile device. The list 800 includes a first item 802, a second item 804 and a third item 806. The three items 802, 804 and 806 represent a list that is displayed on the display screen of the mobile device. The list 800 can be manipulated using navigation buttons on the mobile device in conjunction with user command buttons 808 and 810. The user command button 808 performs a read command for a selected one of the list items, and the user command button 810 performs a delete command to delete a selected one of the list items. The displayed list 800 is defined by a representative descriptive file, such as "headers.wml" which is a wireless markup language (WML) file that defines the list 800.

Conventionally, if the list 800 were to be modified, the mobile device would need to interact with the server sponsoring the list 800. For example, if the user of the mobile device were to select the first list entry 802 and then select the user command button 810, the user would request that the first list item 802 be removed from the list 800. However, to implement the change to the list 800, the mobile device would need to tell the server sponsoring the list (e.g., a remote server) that the user has requested a certain modification. Then, the mobile device would wait for the remote server to modify the master list at the sponsoring server, and then forward an updated descriptive file (e.g., "headers.wml" file) to the mobile device. One problem with the conventional approach is that it requires interaction with the server which tends to introduce undesired latencies and involve significant waiting periods for the user due to periodic wireless network unavailability.

According to the third aspect of the invention, lists displayed on display screens of mobile devices are able to be manipulated without interaction with remote servers through a wireless network. In other words, the displayed lists are able to be manipulated by local processing on the mobile device without any need for wireless network availability. Thereafter, the appropriate sponsoring servers can be informed (e.g., asynchronously) of the modifications that have been made to the lists so that the server can update the master list.

As shown in FIG. 8, a data structure referred to as a list object 812 is provided on the mobile device. The list object 812 is used to manage and manipulate the displayed list 800. The list object 812 is referred to as "headerlist.lst" and, in this example, corresponds to the "headers.wml" file which pertains to the displayed list 800. The list object 812 includes a list specification 814 that defines the characteristics of the list. Additionally, the list object 812, after being initiated by a list manager (e.g., list manager 118), includes various list elements that correspond to entries in the list. In particular, the list object 812 illustrated in FIG. 8 includes a first list element 816, a second list element 818 and a third list element 820. The list elements 816, 818 and 820 respectively correspond to the entries 802, 804 and 806 of the displayed list 800.

The list specification 814 contains information on the characteristics of the list. These characteristics include: a base URI for the list, ascending or descending display order, a target element, maximum number of items in the list, a reclamation algorithm, access control and notification handlers. The base URI points to a descriptive file for the list (e.g., headers.wml). The target element is a pointer to a portion of the descriptive file of the displayed list that can be altered by the list manager. The maximum number of items indicates the maximum number of items that the list can hold. The reclamation algorithm indicates a technique by which the memory space being consumed by the list can be reclaimed. The access control indicates which domains on remote servers are permitted to access files associated with the list. The notification handlers operate to trigger certain requests or actions (via URLs) when events occur with respect to the list. For example, a sponsoring server (remote server) is notified when modifications are locally made to a list. Examples of notification handles include: OnDelete, Oninsert, OnLock, OnUnLock, and OnGetList.

Each of the list elements 816, 818 and 820 include a title, a resource location, and a sort key. The title (or label) for a list element is that which is displayed in a list entry of a displayed list. For example, the first list element 816 would have a title "Joe" and thus, the first list item 802 in the displayed list 800 is entitled "Joe". However, the list item 802, 804 and 806 are displayed from the descriptive file (headers.wml) for the displayed list 800. The resource location is a pointer to the resource behind the list element. For example, if the first list element 816 corresponds to an e-mail from "Joe", then the resource location (resource_location-1) is a file describing the contents of the email (e.g., joe.wml). The sort key for a list element is used to sort the elements or entries of a list.

The manipulation of a displayed list by local processing is explained by the following representative example. Assume that the list entry 802 of the displayed list 800 is being deleted by a user of the mobile device. To initiate the deletion of the list entry 802, the user would select the list entry 802 and then activate the user command button 810. In response to the activation of the user command button 810, the list manager would locate the corresponding list element 816 within the list object 812 that is associated with the displayed list 800. Then, the list manager would modify the list object 812 by removing the list item 816 from the list object 812. Next, the list manager would locate the target element within the descriptive file (headers.wml) for the displayed list 800 using the contents of the list specification 814. Then, within the target element, the list manager would find a target portion pertaining to the list entry 802 within the descriptive file. One approach to finding the appropriate target portion would be to search the target element using the title (e.g., Joe) of the list entry sought. Once at the target portion within the descriptive file, the list manager would edit the descriptive file by removing the content associated with the list entry 802. Besides the searching and editing approach, another approach is to regenerate the target elements (or the whole descriptive file) to match the current state of the list elements within the list object. By modifying (e.g., edit or regenerate) the descriptive files for the displayed list 800, the mobile device is caused to redisplay the displayed list 800 such that the list entry 802 is no longer present. At this point, the displayed list 800 has only two list entries (804 and 806) and the list object 812 would have only two list elements (818 and 820). Note that all this processing occurs locally on the mobile device without any interaction with the appropriate server via a wireless network. However, to keep the server notified of changes to displayed lists, the notification handlers contained or pointed to by the list specification 814 are utilized. In this representative example, an on-delete notification handler can be selected and a URL designated by that notification handler can be used to send a notification message to the appropriate server. In one embodiment, the notification messages sent by the mobile machine are asynchronously sent using asynchronous messaging techniques described above.

Although the list elements 816, 818 and 820 are part of the list object 802, the list entries could form part of the descriptive file associated with the displayed list 800. Such an approach may be more memory efficient.

An exemplary list specification (in a WML format) for a user's stock portfolio that can list up to ten (10) stocks as well as delete particular stocks is as follows.

```
<LIST BASE="http://stocks.uplanet.com/" HREF=
    "portfolio.wml" ID="stocklist" >
    <!-- maximum of 10 items in the portfolio -->
    <RESOURCES MAXITEMS="10" RECLAIM=
        "FIFO"/>
    <!-- when the user deletes an item from the list, remove
        it from the portfolio -->
    <NOTIFY TYPE="OnDelete" HREF="delete.cgi"/>
</LIST>
```

The target document can be the following WML deck, with a single card shown. The text in the card presents the title of the list. Also, a menu option provides a link to a menu of commands that can operate on the currently selected options.

```
<WML>
    <CARD>
        <DO TYPE="OPTION" LABEL="Menu"
            ONCLICK="menu.wml"/>
        My Stock Portfolio
        <SELECT ID="stocklist" KEY="K">
            <!-- list entries will be placed here as OPTIONs
                -->
        </SELECT>
    </CARD>
</WML>
```

Figure 9:
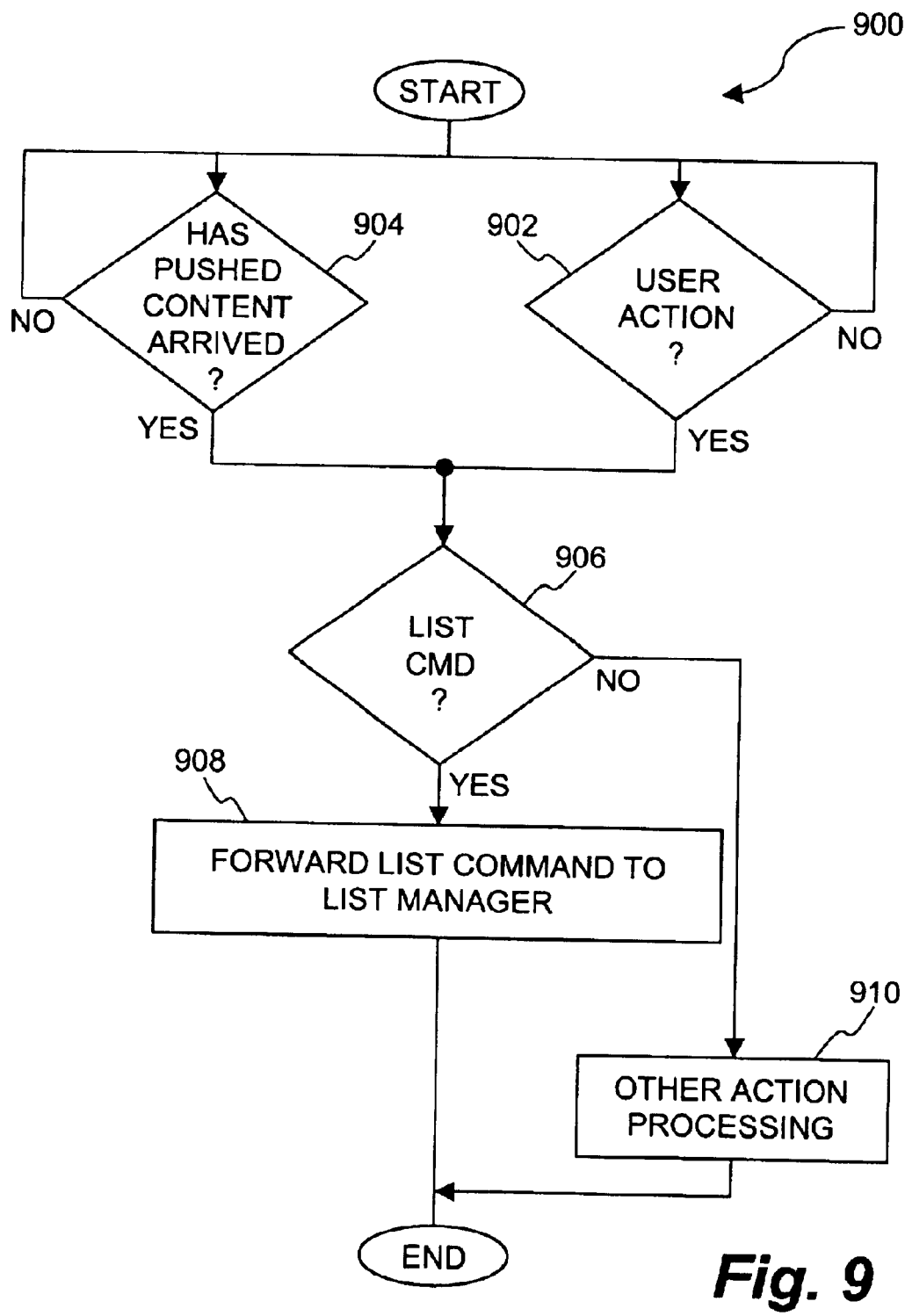
FIG. 9 is a flow diagram of general mobile device action processing according to an embodiment of the invention.

FIG. 9 is a flow diagram of general mobile device action processing 900 according to an embodiment of the invention. The general mobile device action processing 900 indicates how a list manager is activated.

The general mobile device processing 900 begins with a decision block 902 that determines whether user action has occurred. If no user action has occurred, then the general mobile device processing 900 awaits the reception of user action. Alternatively, a decision block 904 is provided to determine whether pushed content has arrived. When the decision block 904 determines that no pushed content has arrived, then the general mobile device processing 900 awaits the arrival of pushed content. Hence, the general mobile device processing 900 is in a wait state until either user action has occurred or pushed content has arrived at the mobile device. Once either of these has occurred, the general mobile device processing 900 continues.

When the general mobile device processing 900 continues, a decision block 906 determines whether the invoking action is a list command. When the decision block 906 determines that the invoking action is a list command, then the list command is forwarded 908 to the list manager. The list manager then processes the list command. As an example, a list command can be signified by having the prefix "listmgr:". On the other hand, when the decision block 906 determines that the invoking action for either the user action or the received push content is not a list command, then other action processing 910 is performed. The other action processing 910 can be convention processing of commands. Following block 910 as well as following block 908, the general mobile device processing 900 is complete and ends. While the general mobile device processing 900 is described as generalized processing, it should be recognized that FIG. 9 is illustrated to indicate how and when certain commands are directed to a list manager for their processing.

Figure 10:
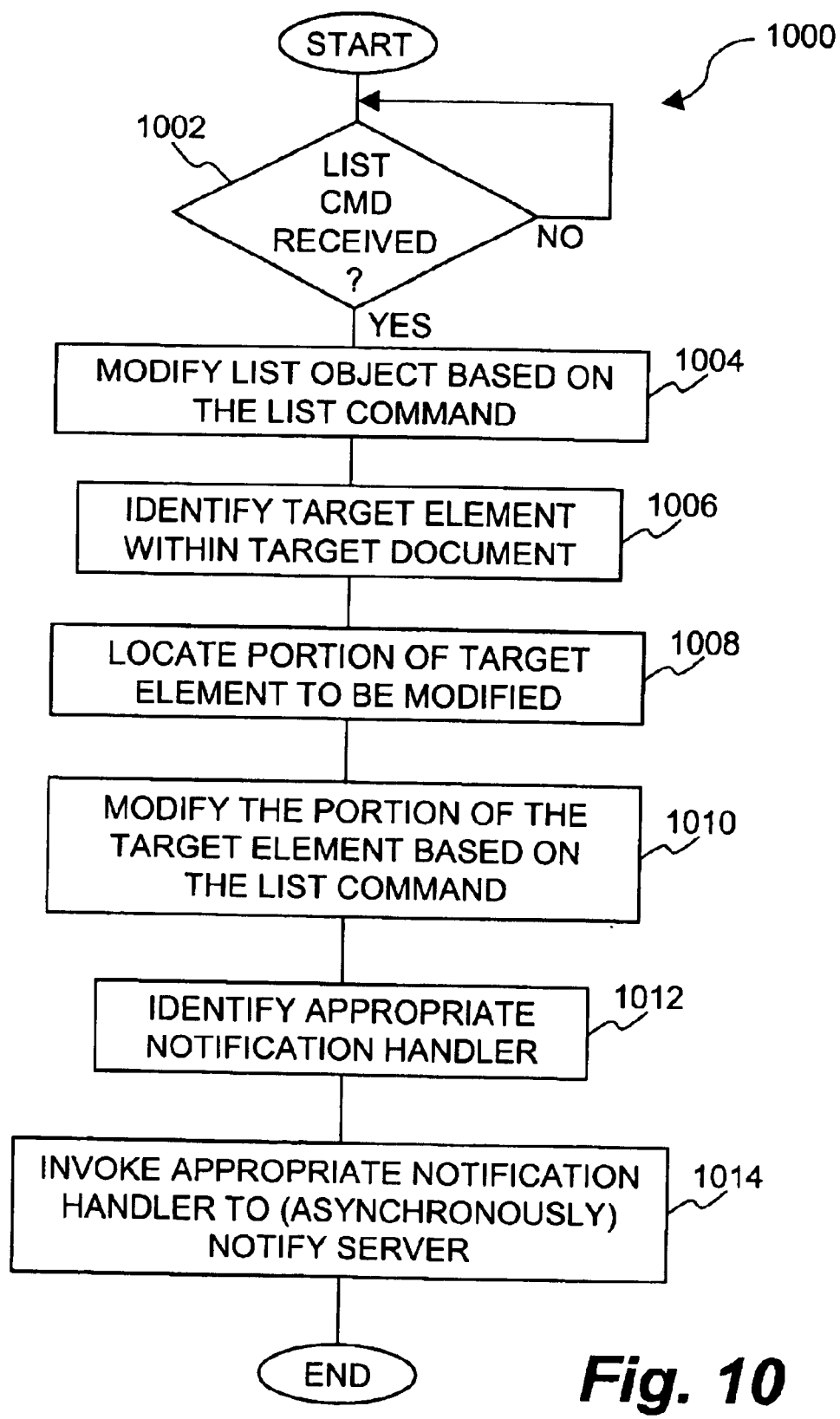
FIG. 10 is a flow diagram of list command processing according to an embodiment of the invention.

FIG. 10 is a flow diagram of list command processing 1000 according to an embodiment of the invention. The list command processing 1000 is, for example, performed by the list manager 118 illustrated in FIG. 1.

The list command processing 1000 begins with a decision block 1002. The decision block 1002 determines whether a list command has been received. Until a list command has been received, the list command processing 1000 is in a wait state. Once the decision block determines that a list command has been received, the list command processing 1000 continues. Once the list command processing 1000 continues, a list object is modified 1004 based on the list command. Next, the target element within the target document is identified 1006. Then, within the target element that has been identified, a portion of the target element to be modified is located 1008. Then, the portion of the target element is modified 1010 based on the list command. For example, if the list command requested deletion of a list entry, then a portion of the target element would be removed from the target document. On the other hand, if the list command requested insertion, then additional content would be inserted into the target document at the portion (i.e., a particular position) of the target element.

After having modified the target document in accordance with the list command, an appropriate notification handler is identified 1012. Typically, the appropriate notification handler can be selected based on the type of list command that has been processed. After identifying 1012 the appropriate notification handler, the appropriate notification handler is invoked 1014 to notify a sponsoring server (remote server) of the modifications made to the target document. The sponsoring server typically holds a master of the target document and thus the notification to the sponsoring server allows the server to modify the master document in accordance with the user's actions on the mobile device. In one embodiment, the notification provided to the server is performed by an asynchronous message that is sent by an asynchronous message handler such as described above. Asynchronous notification is preferred because the mobile device need not wait for any server actions which, if required, would induce latencies or delays to the user of the mobile device. Following block 1014, the list command processing 1000 is complete and ends.

Figure 11:
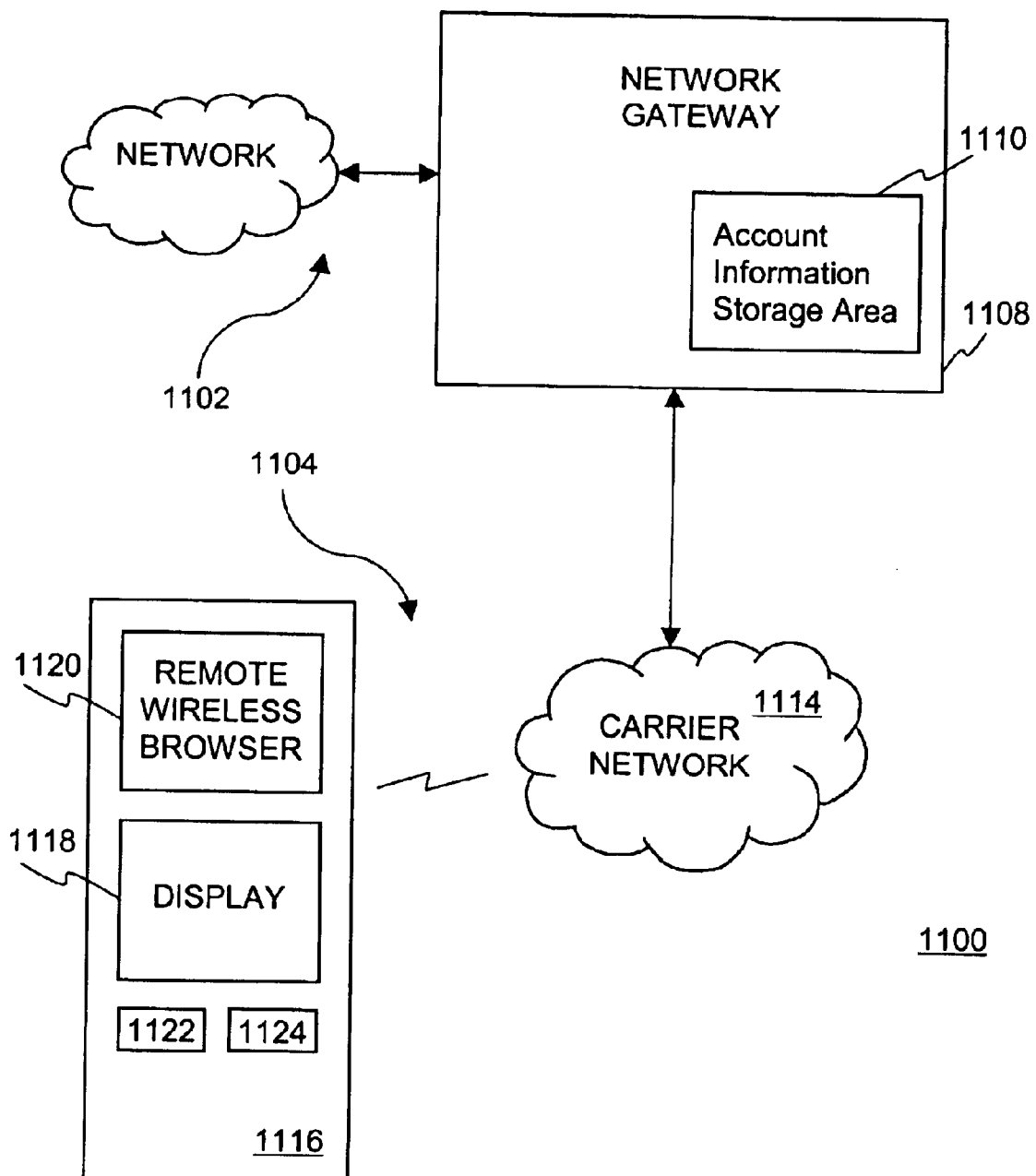
FIG. 11 is a block diagram of a representative communication system for use with the invention.

FIG. 11 is a block diagram of a representative communication system 1100 for use with the invention. The communication system 1100 includes a wired section 1102 and a wireless section 1104. The wired section 1102 includes a network 1106 and a network gateway 1108. In one embodiment, the network 1106 is the Internet, which represents a large number of interconnected computers. In another embodiment, the network 1106 is an intranet or private network of computers.

The network gateway 1108 operates to provide a gateway from the wired section 1102 and the wireless section 1104. The network gateway 1108 serves as a primary transition point between the wireless communication of the wireless section 1104 and the wired communication of the wired section 1102. The network gateway 1108 receives the incoming content request from the carrier network 1114 and performs protocol conversion as necessary. The network gateway 1108 will normally perform some protocol translation and other account management and verification operations. The network gateway 1108 includes an account information storage area 1110 that stores account, configuration and other information. The wireless section 1104 includes a carrier network 1114 and at least one remote wireless computing device 1116. The network gateway 1108 also receives messages from the network 1106 and forwards them to the appropriate remote computing devices.

The remote computing device 1116 can, for example, be a mobile phone, a Personal Digital Assistant (PDA), or a portable general purpose computer. The remote wireless computing device 1116 includes a display 1118 for displaying screens or pages of information, a remote wireless browser 1120, and navigation buttons 1122 and 1124. The remote wireless browser 1120 is usually an application program that executes on the remote computing device 1116. The remote wireless browser 1120 provides the screens or pages of information to be displayed on the display 1118. The navigation buttons 1122 and 1124 allow a user to navigate through or make selections from menus or lists being displayed on the display 1118 by the remote wireless browser 1120. The remote wireless computing device 1116 can also include an alphanumeric keypad (not shown) that allows a user to enter alphanumeric information, though such is not necessary as alphanumeric information can also be entered using a dial screen displayed on the display 1118 with selections being made using the navigation buttons 1122 and 1124. By interacting with the remote wireless browser 1120, a user is able to access information located on the network 1106. According to the invention, the remote wireless browser 1120 of the mobile device 1116 is able to operate with substantially less waiting for server interaction, which is particularly beneficial when the wireless section 1104 is unable to communicate with the wired section 1102.

Typically, the wireless section 1104 will include a plurality of remote wireless browsers 1120, each of which executes on a different remote computing device. The configuration and other information stored in the account information storage area 1110 can store service limitations, security limitations, pre-selected content channels, preference information, screen configuration information, and the like for each of the remote wireless browsers 1120. The account information storage area 1110 can also store data or pages of data that are of interest to the remote wireless browsers 1120. The stored data or pages can operate as a cache of information previously requested from the network 1106 or can operate as an information server within the network gateway 1 108. For example, as an information server, the storage pages can represent pages to be displayed by the remote wireless browsers.

In one embodiment, the remote wireless browser 1120 understands and displays WML content type which was designed for mobile devices. The specification for WML, "Wireless Application Protocol Wireless Markup Language Specification" (WAP WML), Apr. 30, 1998 is hereby incorporated by reference.

The advantages of the invention are numerous. Several advantages that embodiments of the invention may include are as follows. One advantage of the invention is that operation of mobile devices is less dependent on network availability. As a result, users of mobile devices experience better responsiveness and less waiting. Another advantage of the invention is that both synchronous and asynchronous messaging are available to mobile devices. Still another advantage of the invention is that a programmer or content author can determine how navigation is performed, namely whether synchronous requests or asynchronous requests are used. Yet another advantage of the invention is that lists can be manipulated on mobile devices without having to support or provided the significant amounts of resources needed to provide scripting. Another advantage of the invention is the ability to obtain and guarantee the presence of certain content channels at mobile devices.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for sending a resource request of a mobile device to a remote server through a wireless network, said method comprising the acts of:
   (a) receiving a resource request, the requested resource being associated with the remote server;
   (b) determining whether the requested resource is of a synchronous type resource request or of an asynchronous type resource request;
   (c) placing the resource request in an outgoing queue and not awaiting a resource reply when said determining (b) determines that the resource request is an asynchronous type resource request; and
   (d) when said determining (b) determines that the resource request is a synchronous type resource request, performing the acts of
      (d1) determining whether the requested resource is present in a local cache memory of the mobile device;
      (d2) supplying the requested resource from the local cache memory when said determining (d) determines that the requested resource is present in the local cache memory; and
      (d3) sending the resource request to the remote server through the wireless network and awaiting a resource reply when said determining (d) determines that the requested resource is not present in the local cache memory.

2. A method as recited in claim 1, wherein said method further comprises:
   (e) removing the resource request from the outgoing queue when the wireless network is available and then sending the resource request to the remote server through the wireless network.

3. A method as recited in claim 2, wherein said method further comprises:
   (f) receiving a resource reply at the mobile device in response to the asynchronous resource request via the wireless network when the wireless network is available.

4. A method as recited in claim 3, wherein said method further comprises:
   (g) storing the resource reply in the cache memory.

5. A method as recited in claim 1, wherein the application executing on the mobile device issues the resource request and indicates whether the resource request is a synchronous resource request or asynchronous resource request.

6. A method as recited in claim 1, wherein the application is a web browser, and the resource request references a universal resource identifier.

7. A method as recited in claim 6, wherein the mobile device is one of a mobile telephone, a mobile pager, a mobile personal digital assistant, and a mobile computer.

8. A method as recited in claim 7, wherein said method further comprises:
  (e) determining whether the wireless network is available; and
  (f) removing the asynchronous resource request from the outgoing queue when the wireless network is available and then sending the asynchronous resource request to the remote server through the wireless network.

9. A method as recited in claim 8, wherein the application executing on the mobile device issues the resource request and indicates whether the resource request is a synchronous resource request or asynchronous resource request.

10. A mobile device that connects to a remote server through a network, said mobile device comprising:
  an application that executes on said mobile device, said application produces outgoing messages that are to be sent to the remote server;
  an asynchronous message queue that stores outgoing messages from said application that are to be sent from said mobile device to the remote server; and
  an asynchronous message manager that manages the sending of the outgoing messages from said asynchronous message queue to the remote server through the network,
  wherein the outgoing messages are synchronous or asynchronous messages,
  wherein said mobile device further comprises a synchronous message manager that manages the sending of the synchronous messages to the remote server through the network,
  wherein said asynchronous message queue stores the asynchronous messages from said application that are to be sent from said mobile device to the remote server, and
  wherein said asynchronous message manager that manages the sending of the asynchronous messages from said asynchronous message queue to the remote server through the network.

11. A mobile device as recited in claim 10,
  wherein the network comprises a wireless network,
  wherein said application requests asynchronous transmission of the outgoing messages, and
  wherein said application does not await to receive reply messages from the remote server in response to the outgoing messages.

12. A mobile device as recited in claim 10,
  wherein the network comprises a wireless network,
  wherein the outgoing messages are requests for resources, and
  wherein said mobile device further comprises:
    a cache memory that stores resources likely to be requested by said application;
    a channel manager that loads a content channel into said cache memory from the remote server through the wireless network.

13. A mobile device as recited in claim 12, wherein said channel manager loads a content channel when said mobile device is provisioned or on a user request.

14. A mobile device as recited in claim 12, wherein the content channel comprises channel resources,
  wherein said channel manager stores the channel resources in a reserved portion of said cache memory.

15. A mobile device as recited in claim 14, wherein the channel resources stored in the reserved portion of said cache memory are protected from cache clean-up or refresh processing.

16. A mobile device as recited in claim 12,
  wherein the network comprises a wireless network,
  wherein the outgoing messages are requests for resources, and
  wherein said mobile device further comprises a list manager that manages lists provided on said mobile device such that lists can be manipulated without interaction with the remote server through the wireless network.

17. A mobile device that connects to a remote server through a network, said mobile device comprising:
  an application that executes on said mobile device, said application produces outgoing messages that are to be sent to the remote server;
  an asynchronous message queue that stores outgoing messages from said application that are to be sent from said mobile device to the remote server; and
  an asynchronous message manager that manages the sending of the outgoing messages from said asynchronous message queue to the remote server through the network,
  wherein the network comprises a wireless network,
  wherein the outgoing messages are requests for resources, and
  wherein said mobile device further comprises a list manager that manages a list provided on said mobile device such that lists can be manipulated without interaction with the remote server through the wireless network.

18. A mobile device as recited in claim 17, wherein said mobile device stores a list object for the list, the list object facilitates said list manager in manipulating the list.

19. A mobile device as recited in claim 18,
  wherein the list is display on a display device of said mobile device, and
  wherein said list object comprises: a list specification that describes the list, and a plurality of list elements that correspond to each entry of the displayed list.

20. A mobile device as recited in claim 17, wherein said mobile device stores a list object for the list, the list object facilitates said list manager in manipulating the list as well as subsequent asynchronous notification of the remote server of the manipulations that have been made to the list.

21. A computer readable medium including computer program code for sending a resource request of a mobile device to a remote server through a wireless network, said computer readable medium comprising:
  computer program code for receiving a resource request, the requested resource being associated with the remote server;
  computer program code for determining whether the requested resource is of a synchronous type resource request or of a an asynchronous type resource request;
  computer program code for placing the resource request in an outgoing queue and not awaiting a resource reply when the resource request is an asynchronous type resource request; and
  computer program code for sending the resource request to the remote server through the wireless network and awaiting a resource reply when the resource request is a synchronous type resource request.

22. A computer readable medium as recited in claim 21, wherein said computer readable medium further comprises:
  computer program code for removing the resource request from the outgoing queue when the wireless network is available and then sending the resource request to the remote server through the wireless network.

23. A computer readable medium as recited in claim 22, wherein said computer readable medium further comprises:

computer readable medium for receiving a resource reply at the mobile device in response to the asynchronous resource request via the wireless network when the wireless network is available.

24. A computer readable medium as recited in claim 21, wherein the application executing on the mobile device issues the resource request and indicates whether the resource request is a synchronous resource request or asynchronous resource request.

25. A computer readable medium as recited in claim 24, wherein the application is a web browser, and the resource request references a universal resource identifier.

26. A computer readable medium as recited in claim 25, wherein the mobile device is one of a mobile telephone, a mobile pager, a mobile personal digital assistant, and a mobile computer.

27. A computer readable medium as recited in claim 21, wherein said computer readable medium further comprises:

computer program code for determining whether the wireless network is available; and computer program code for removing the asynchronous resource request from the outgoing queue when the wireless network is available and then sending the asynchronous resource request to the remote server through the wireless network.

28. A computer readable medium as recited in claim 27, wherein the application executing on the mobile device issues the resource request and indicates whether the resource request is a synchronous resource request or asynchronous resource request.

* * * * *

UNITED STATES PATENT AND TRADEMARK OFFICE
CERTIFICATE OF CORRECTION

PATENT NO. : 6,721,288 B1
DATED : April 13, 2004
INVENTOR(S) : King et al.

It is certified that error appears in the above-identified patent and that said Letters Patent is hereby corrected as shown below:

Column 3,
Line 9, "even it" should be -- even if --.
Line 44, after "namely" insert -- asynchronous requests. Such as asynchronous communications allow the processing at a mobile --.

Signed and Sealed this

Seventeenth Day of August, 2004

JON W. DUDAS
*Acting Director of the United States Patent and Trademark Office*